United States Patent
Shao et al.

(10) Patent No.: US 12,001,052 B2
(45) Date of Patent: Jun. 4, 2024

(54) RADIATION-RESISTANT LASER OPTICAL FIBER PREFORM CORE ROD AND PREPARATION METHOD THEREFOR

(71) Applicant: Shanghai Institute of Optics and Fine Mechanics, Chinese Academy of Sciences, Shanghai (CN)

(72) Inventors: Chongyun Shao, Shanghai (CN); Lili Hu, Shanghai (CN); Chunlei Yu, Shanghai (CN); Meng Wang, Shanghai (CN); Yan Jiao, Shanghai (CN); Lei Zhang, Shanghai (CN); Shikai Wang, Shanghai (CN); Xiaoqing Xu, Shanghai (CN)

(73) Assignee: SHANGHAI INSTITUTE OF OPTICS AND FINE MECHANICS, CHINESE ACADEMY OF SCIENCES, Shanghai (CN)

( * ) Notice: Subject to any disclaimer, the term of this patent is extended or adjusted under 35 U.S.C. 154(b) by 128 days.

(21) Appl. No.: 17/761,075

(22) PCT Filed: Jul. 1, 2020

(86) PCT No.: PCT/CN2020/099708
§ 371 (c)(1),
(2) Date: Mar. 16, 2022

(87) PCT Pub. No.: WO2021/051954
PCT Pub. Date: Mar. 25, 2021

(65) Prior Publication Data
US 2022/0342147 A1 Oct. 27, 2022

(30) Foreign Application Priority Data
Sep. 16, 2019 (CN) .......................... 201910872955.9

(51) Int. Cl.
G02B 6/02 (2006.01)
C03C 25/1065 (2018.01)
G02B 6/036 (2006.01)

(52) U.S. Cl.
CPC ...... *G02B 6/02395* (2013.01); *C03C 25/1065* (2013.01); *G02B 6/036* (2013.01); *C03B 2201/34* (2013.01)

(58) Field of Classification Search
CPC ............... G02B 6/02395; G02B 6/036; C03C 25/1065; C03B 2201/34
See application file for complete search history.

(56) References Cited

U.S. PATENT DOCUMENTS 4,515,612 A * 5/1985 Burrus, Jr. ............ C03C 13/047
65/30.13
5,937,134 A * 8/1999 DiGiovanni ........ H01S 3/06708
372/6
(Continued)

FOREIGN PATENT DOCUMENTS

CN     1287979 A * 3/2001 ....... C03B 37/01838
CN     1287979 A     3/2001
(Continued)

OTHER PUBLICATIONS

I. J. R. Baumvol, E. P. Gusev, F. C. Stedile, F. L. Freire, M. L. Green, D. Brasen; On the behavior of deuterium in ultrathin SiO2SiO2 films upon thermal annealing. Appl. Phys. Lett. Jan. 26, 1998; 72 (4): 450-452. https://doi.org/10.1063/1.120801 (Year: 1998).*
(Continued)

*Primary Examiner* — Peter Radkowski
(74) *Attorney, Agent, or Firm* — Panitch Schwarze Belisario & Nadel LLP

(57) ABSTRACT

A radiation-resistant laser optical fiber preform core rod at least includes one type of activated ion ($Yb^{3+}$, $Er^{3+}$) and one or more types of co-doped ion ($Al^{3+}$, $P^{5+}$, $Ge^{4+}$, $Ce^{3+}$, $F^-$),
(Continued)

and —OD group of 16-118 ppm. Irradiation resistance of core rod glass can be effectively improved by sequentially performing pre-treatments, i.e. deuterium loading, pre-irradiation and thermal annealing on a preform core rod. Electron paramagnetic resonance test shows that, under the same radiation condition, the radiation induced color center concentration in a preform core rod treated by the method above is lower than in an untreated core rod by one or more orders of magnitude. The obtained core rod can be used for preparing a radiation-resistant rare earth-doped silica fiber, and has the advantages of high laser slope efficiency, low background loss, being able to be used stably in a vacuum environment for a long time, for example.

11 Claims, 15 Drawing Sheets

(56) References Cited

U.S. PATENT DOCUMENTS

| | | | | |
|---|---|---|---|---|
| 6,578,387 | B2* | 6/2003 | Tankala | C03B 37/01838 65/390 |
| 6,622,527 | B2* | 9/2003 | Schotz | C03B 19/1453 65/424 |
| 6,643,442 | B2* | 11/2003 | Brambilla | G02B 6/02114 385/132 |
| 8,467,123 | B2* | 6/2013 | Regnier | C03B 37/01433 359/341.5 |
| 8,494,013 | B2* | 7/2013 | Gray | C03B 37/01446 65/390 |
| 9,025,925 | B2* | 5/2015 | Cadier | G02B 6/03611 385/127 |
| 10,228,510 | B2* | 3/2019 | Alkeskjold | G02B 6/02395 |
| 11,091,385 | B2* | 8/2021 | Kitamura | C03B 37/02727 |
| 2002/0170320 | A1* | 11/2002 | Schotz | C03C 25/607 65/435 |
| 2002/0186942 | A1* | 12/2002 | Bubnov | C03B 37/027 65/435 |
| 2003/0024275 | A1* | 2/2003 | Tankala | C03B 37/01838 65/390 |
| 2003/0039459 | A1* | 2/2003 | Brambilla | G02B 6/13 385/132 |
| 2004/0060327 | A1* | 4/2004 | Berkey | C03C 13/047 65/424 |
| 2006/0248925 | A1* | 11/2006 | Sanders | C03C 13/045 65/424 |
| 2007/0193305 | A1* | 8/2007 | Shirley | C03B 37/00 65/424 |
| 2008/0053150 | A1* | 3/2008 | Moore | C03B 19/1461 65/17.6 |
| 2010/0142033 | A1* | 6/2010 | Regnier | C03C 3/095 977/773 |
| 2012/0069858 | A1* | 3/2012 | Gray | C03C 4/0071 385/124 |
| 2013/0101261 | A1* | 4/2013 | Cadier | G02B 6/036 65/390 |
| 2017/0351023 | A1* | 12/2017 | Alkeskjold | G02B 6/02395 |
| 2019/0185365 | A1* | 6/2019 | Kitamura | C03B 37/027 |
| 2019/0258001 | A1* | 8/2019 | Alkeskjold | C03C 13/045 |

FOREIGN PATENT DOCUMENTS

| | | | | |
|---|---|---|---|---|
| CN | 1287979 | C | * 12/2006 | |
| CN | 103373811 | A | * 10/2013 | |
| CN | 103373811 | A | 10/2013 | |
| CN | 103373811 | B | * 5/2015 | |
| CN | 106116136 | A | * 11/2016 | ........... C03B 37/018 |
| CN | 106116136 | A | 11/2016 | |
| CN | 109574491 | A | * 4/2019 | ........... C03B 37/012 |
| CN | 109574491 | A | 4/2019 | |
| CN | 111025459 | A | 4/2020 | |
| EP | 2303788 | B1 | * 10/2012 | ....... C03B 37/02718 |
| JP | S6051625 | A | 3/1985 | |
| JP | S6090852 | A | 5/1985 | |
| JP | 2008239441 | A | * 10/2008 | |

OTHER PUBLICATIONS

N. Zhao, W. Li, J. Li, G. Zhou and J. Li, "Elimination of the Photodarkening Effect in an Yb-Doped Fiber Laser With Deuterium," in Journal of Lightwave Technology, vol. 37, No. 13, pp. 3021-3026, 1 Jul. 1, 2019, doi: 10.1109/JLT.2019.2909575. (Year: 2019).*

Phifer et al., Radiation and Hydrogen in Glass. Part II: The Properties of Hydrogen in Unirradiated and Irradiated Silica and Borosilicate Glasses, SAND90-0951 • UC-404, 1990 (Year: 1990).*

Dragic et al., Materials for optical fiber lasers: A review, Appl. Phys. Rev. 5, 041301 (2018) https://doi.org/10.1063/1.5048410 (Year: 2018).*

Liu et al., Multi-kW Yb-doped aluminophosphosilicate fiber, Opt. Mater. Express 8, 2114-2124 (2018) (Year: 2018).*

Scheuner et al., Advances in optical fibers fabricated with granulated silica, in Optical Fiber Communication Conference, OSA Technical Digest (online) (Optica Publishing Group, 2017), paper M2F.3. (Year: 2017).*

Wang et al., Influences of Thermal Annealing Temperatures on Irradiation Induced E' Centers in Silica Glass, in IEEE Transactions on Nuclear Science, vol. 55, No. 5, pp. 2685-2688, Oct. 2008, doi: 10.1109/TNS.2008.2003439; (Year: 2008).*

J. E. Shelby, P. L. Mattern, D. K. Ottesen; Radiation-induced isotope exchange in vitreous silica. J. Appl. Phys. Aug. 1, 1979; 50 (8): 5533-5535. https://doi.org/10.1063/1.326615 (Year: 1979).*

Office Action dated Jun. 9, 2021 in CN Application No. 201910872955.9.

Office Action dated Aug. 23, 2021 in CN Application No. 201910872955.9.

Limminum et al, "China Report on the Progress of the Technical Development of Nuclear Science," vol. 5, pp. 86-87 (2018).

Deposition only et al, "Radiation Resistance Design and Radiation Effects," Chinese Scientific and Technical Press, vol. 1, p. 250 (2015).

Int'l Search Report dated Oct. 10, 2020 in Int'l Application No. PCT/CN2020/099708.

Shao et al, "Enhanced radiation resistance of ytterbium-doped silica fiber by pretreating on a fiber preform," Optical Materials Express, vol. 10, No. 2, pp. 408-420 (2020).

Chen at al, "Ytterbium-doped Sllica Fiber for High Power System: A Review of Research Progress and Development Trend," Acta Phontonica Sinica, vol. 48, No. 11, pp. 1148012-1-1148012-10 (2019).

Yeniay et al, "Radiation induced loss properties and hardness enhancement technique for ErYb doped fibers for avionic applications," Optical Fiber Technology, vol. 19, No. 2, pp. 88-92 (2013).

* cited by examiner

RADIATION-RESISTANT LASER OPTICAL FIBER PREFORM CORE ROD AND PREPARATION METHOD THEREFOR

CROSS-REFERENCE TO RELATED APPLICATIONS

This application is a Section 371 of International Application No. PCT/CN2020/099708, filed Jul. 1, 2020, which was published in the Chinese language on Mar. 25, 2021 under International Publication No. WO 2021/051954 A1, which claims priority under 35 U.S.C. § 119 to Chinese Patent Application No. 201910872955.9, filed on Sep. 16, 2019 the disclosures of all of which are incorporated herein by reference in their entireties.

TECHNICAL FIELD

The invention relates to the field of optical fiber manufacturing, in particular to a radiation-resistant laser optical fiber preform core rod and a preparation method therefor.

BACKGROUND

Rare earth (such as Yb, Er, Tm) doped silica fiber laser or amplifier has the advantages of light weight, small size, high electro-optical conversion efficiency, high peak power, narrow line width, etc., and has important application value in space communication, lidar, space debris removal, space-borne laser weapon, etc. However, laser or amplifier will face harsh ionization radiation (such as protons, electrons, X-rays and gamma rays) during space missions. Ionization radiation will lead to a sharp increase in loss of active optical fiber, a sharp decrease in laser slope efficiency, and even no laser output in severe cases in the laser or amplifier.

Research shows that the radiation-induced loss of rare earth-doped active optical fiber is more than 1000 times larger than that of non-rare earth-doped passive optical fiber under the same radiation condition. For example, our early experimental results show that after 50 krad of X-ray radiation, the radiation-induced losses in $Ge^{4+}$ single-doped silica fiber and $Yb^{3+}/Al^{3+}/P^{5+}$ co-doped silica fiber are 5.2 dB/km and 5.1 dB/m, respectively. Co-doping Al or P can improve the solubility of rare earth ions in silica matrix and regulate the refractive index of fiber core, but the formation of Al or P-related color centers caused by ionization radiation is the main reason for the sharp increase in the loss of rare earth-doped active optical fibers (The Journal of Physical Chemistry B, 2018, 122(10): 2809-2820).

In order to improve the radiation resistance of optical fiber, domestic and foreign researchers have done a lot of research work and put forward corresponding solutions. European Draka Comteq BV Company (U.S. Pat. No. 8,467,123B2) proposed to improve the solubility of rare earth ions in silica glass through nanoparticle doping technology, thus reducing or even not doping radiation sensitive elements such as Al or P. However, only relying on nanoparticle doping technology cannot effectively disperse rare earth ion clusters. In order to avoid the concentration quenching effect, this method requires the co-doping concentration of rare earth ions to be less than 1000 ppm. France's iXblue company (U.S. Pat. No. 9,025,925B2) proposed to use phosphosilicate glass as the core matrix material, and introduce cerium (Ce) to improve the radiation resistance of Er—Ybco-doped silica fiber. However, in order to ensure that the radiation resistance of the optical fiber can meet the needs of space applications (the total cumulative radiation dose over ten years is greater than 500 Gy), the doping content of Ce is usually required to be greater than 5000 ppm, which will lead to a sharp increase in the refractive index of fiber core and seriously deteriorate beam quality. In addition, co-doping excess CE will reduce the laser slope efficiency of active fiber.

Although there are already some solutions to improve the radiation resistance of the optical fibers in the prior art, the problems of the existing solutions may include: 1) They mainly involve optimizing the composition or preparation process of the preform core rod, and rarely involve optimizing the pre-treatment process of the preform; 2) The optical fiber itself is pre-treated with hydrogen-loading or deuterium-loading, and the gas escaping problem is solved by physical shielding method, but this method is complicated in process, and has special requirements on the optical fiber coating, and is not widely applicable; 3) The pure silica fiber or optical fiber preform is subjected to hydrogen-loaded combined pre-irradiation treatment, but no subsequent thermal bleaching or photo bleaching treatment. This pre-treatment method will cause the increase of background loss and hydroxyl content of the optical fiber, and the decrease of mechanical strength of the optical fiber coating, and this pre-treatment method does not involve rare earth-doped silica fiber or optical fiber preform.

SUMMARY

In order to overcome the shortcomings and defects of the existing technology, the present invention provides a radiation-resistant silica-based laser optical fiber preform core rod and a preparation method therefor.

The first aspect of the present invention provides a radiation-resistant laser optical fiber preform core rod, the preform core rod is a silica glass containing activated ions, co-doped ions and —OD groups, wherein the activated ions are one or a combination of $Yb^{3+}$, $Er^{3+}$, the co-doped ions are one or a combination of $Al^{3+}$, $P^{5+}$, $Ge^{4+}$, $Ce^{3+}$, and $F^-$, and the mass ratio of the —OD group in the whole substance is 5 to 150 ppm.

In a preferred embodiment, the composition range of the preform core rod is: $Yb_2O_3$: 0~0.3 mol %, $Er_2O_3$: 0~0.2 mol %, $Al_2O_3$: 0~3 mol %, $P_2O_5$: 0~5 mol %, $GeO_2$: 0~10 mol %, $Ce_2O_3$: 0~0.3 mol %, F: 0~2% mol %, $SiO_2$: 90~99 mol %.

Further, the composition range of the preform core rod is: $Yb_2O_3$: 0~0.2 mol %, $Er_2O_3$: 0~0.1 mol %, $Al_2O_3$: 1.2~2.5 mol %, $P_2O_5$: 0~2.7 mol %, $GeO_2$: 0~4 mol %, $Ce_2O_3$: 0~0.07 mol %, F: 0~1.1% mol %, $SiO_2$: 93.4~98.5 mol %.

In another preferred embodiment, the mass proportion of the —OD group in the total substance is from 16 to 118 ppm.

In another preferred embodiment, radiation induced color center concentration of powder sample of the preform core rod after being irradiated by 1700 Gy gamma rays is $1*10^{14}$ spins/$mm^3$~$150*10^{14}$ spins/$mm^3$, the mass of the powder sample is about 200 mg, and its particle size is less than 1 mm.

Further, the radiation induced color center concentration of powder sample of the preform core rod after being irradiated by 1700 Gy gamma rays is $2.1*10^{14}$ spins/$mm^3$~$120*10^{14}$ spins/$mm^3$.

In another preferred embodiment, the radiation-resistant laser optical fiber preform core rod is made by the following steps:

S1: providing laser optical fiber preform core rod without pre-treatment;

S2: performing gas loading treatment on the preform core rod described in the step S1;

S3: performing high-energy rays pre-irradiation treatment on the preform core rod after the gas loading treatment;

S4: performing thermally annealing treatment on the preform core rod after the pre-irradiation.

In another preferred embodiment, the laser optical fiber preform core rod without pre-treatment is prepared by
1) using a Sol-Gel method combined with a vacuum sintering process; or,
2) using a modified chemical vapor deposition (MCVD) method combined with a solution doping process.

In another preferred embodiment, the gas loading is pure deuterium gas or a mixed gas of deuterium gas and other gas, the volume ratio of the deuterium gas to the mixed gas is 1%-100%, the pressure of the gas loading treatment is 1-20 MPa, the temperature of the gas loading treatment is 20-1000° C., the time of the gas loading treatment is 1-1000 hours, and the other gas is nitrogen or inert gas.

Further, the volume ratio of the deuterium gas to the mixed gas is 5%-100%, the pressure of the gas loading treatment is 5.5-15.4 MPa, the temperature of the gas loading treatment is 80-900° C., and the time of the gas loading treatment is 2-720 hours.

Preferably, the volume ratio of the deuterium gas to the mixed gas is 50%-100%, the pressure of the gas loading treatment is 5.5-10.3 MPa, the temperature of the gas loading treatment is 280-500° C., and the time of the gas loading treatment is 96-240 hours.

More preferably, the volume ratio of the deuterium gas to the mixed gas is 100%, the pressure of the gas loading treatment is 5.5 MPa, the temperature of the gas loading treatment is 280° C., and the time of the gas loading treatment is 240 hours.

In another preferred embodiment, the gas loading is a mixed gas of deuterium gas and nitrogen gas.

In another preferred embodiment, the high-energy rays are high-energy gamma ($\gamma$) rays or X-rays, the total dose of the pre-irradiation is 0-2000 kGy, and the dose rate of the pre-irradiation is 0-100 kGy/h.

Further, the total dose of the pre-irradiation is 0-1000 kGy, and the dose rate of the pre-irradiation is 0.5-58.8 kGy/h.

Preferably, the total dose of the pre-irradiation is 100-1000 kGy, and the dose rate of the pre-irradiation is 5.88-58.8 kGy/h.

More preferably, the total dose of the pre-irradiation is 1000 kGy, and the dose rate of the pre-irradiation is 58.8 kGy/h.

In another preferred embodiment, the temperature of the thermal annealing is 50-1000° C., the time of the thermal annealing is 0-30 hours, the preform core rod is cooled down with the furnace after the thermal annealing is completed, and nitrogen is introduced as a protective gas during the thermal annealing.

Further, the temperature of the thermal annealing is 100-1000° C., and the time of the thermal annealing is 0.5-25 hours.

Preferably, the temperature of the thermal annealing is 200-900° C., and the time of the thermal annealing is 1-20 hours.

More preferably, the temperature of the thermal annealing is 900° C., and the time of the thermal annealing is 10 hours.

A second aspect of the present invention provides a method for preparing the radiation-resistant laser optical fiber preform core rod, the preform core rod is prepared by the following steps:

S1: providing laser optical fiber preform core rod without pre-treatment;

S2: preforming gas loading treatment on the core rod described in the step S1;

S3: performing high-energy rays pre-irradiation treatment on the preform core rod after the gas loading treatment;

S4: performing thermally annealing on the preform core rod after the pre-irradiation treatment.

In a preferred embodiment, the radiation-resistant laser optical fiber preform core rod is a silica glass comprising activating ions, co-doped ions and —OD groups, wherein the activating ions are one or a combination of $Yb^{3+}$, $Er^{3+}$, the co-doped ions are one or a combination of $Al^{3+}$, $P^{5+}$, $Ge^{4+}$, $Ce^{3+}$, and $F^-$, and the mass ratio of the —OD group in the whole substance is 5 to 150 ppm.

In another preferred embodiment, the composition range of the preform core rod is: $Yb_2O_3$: 0~0.3 mol %, $Er_2O_3$: 0~0.2 mol %, $Al_2O_3$: 0~3 mol %, $P_2O_5$: 0~5 mol %, $GeO_2$: 0~10 mol %, $Ce_2O_3$: 0~0.3 mol %, F: 0~2% mol %, $SiO_2$: 90~99 mol %.

Further, the composition range of the preform core rod is: $Yb_2O_3$: 0~0.2 mol %, $Er_2O_3$: 0~0.1 mol %, $Al_2O_3$: 1.2~2.5 mol %, $P_2O_5$: 0~2.7 mol %, $GeO_2$: 0~4 mol %, $Ce_2O_3$: 0~0.07 mol %, F: 0~1.1% mol %, $SiO_2$: 93.4~98.5 mol %.

In another preferred embodiment, the mass proportion of the —OD group in the total substance is from 16 to 118 ppm.

In another preferred embodiment, radiation induced color center concentration of powder sample of the preform core rod after being irradiated by 1700 Gy gamma rays is $1*10^{14}$ spins/mm$^3$~$150*10^{14}$ spins/mm$^3$, the mass of the powder sample is about 200 mg, and its particle size is less than 1 mm.

Further, the radiation induced color center concentration of powder sample of the preform core rod after being irradiated by 1700 Gy gamma rays is $2.1*10^{14}$ spins/mm$^3$~$120*10^{14}$ spins/mm$^3$.

In another preferred embodiment, the laser optical fiber preform core rod without pre-treatment is prepared by
1) using a Sol-Gel method combined with a vacuum sintering process; or,
2) using a modified chemical vapor deposition (MCVD) method combined with a solution doping process.

In another preferred embodiment, the gas loading is pure deuterium gas or a mixed gas of deuterium gas and other gas, the volume ratio of the deuterium gas to the mixed gas is 1%-100%, the pressure of the gas loading treatment is 1-20 MPa, the temperature of the gas loading treatment is 20-1000° C., the time of the gas loading treatment is 1-1000 hours, and the other gas is nitrogen or inert gas.

Further, the volume ratio of the deuterium gas to the mixed gas is 5%-100%, the pressure of the gas loading treatment is 5.5-15.4 MPa, the temperature of the gas loading treatment is 80-900° C., and the time of the gas loading treatment is 2-720 hours.

Preferably, the volume ratio of the deuterium gas to the mixed gas is 50%-100%, the pressure of the gas loading treatment is 5.5-10.3 MPa, the temperature of the gas loading treatment is 280-500° C., and the time of the gas loading treatment is 96-240 hours.

More preferably, the volume ratio of the deuterium gas to the mixed gas is 100%, the pressure of the gas loading treatment is 5.5 MPa, the temperature of the gas loading treatment is 280° C., and the time of the gas loading treatment is 240 hours.

In another preferred embodiment, the gas loading is a mixed gas of deuterium gas and nitrogen gas.

In another preferred embodiment, the high-energy rays are high-energy gamma (γ) rays or X-rays, the total dose of the pre-irradiation is 0-2000 kGy, and the dose rate of the pre-irradiation is 0-100 kGy/h.

Further, the total dose of the pre-irradiation is 0-1000 kGy, and the dose rate of the pre-irradiation is 0.5-58.8 kGy/h.

Preferably, the total dose of the pre-irradiation is 100-1000 kGy, and the dose rate of the pre-irradiation is 5.88-58.8 kGy/h.

More preferably, the total dose of the pre-irradiation is 1000 kGy, and the dose rate of the pre-irradiation is 58.8 kGy/h.

In another preferred embodiment, the temperature of the thermal annealing is 50-1000° C., the time of the thermal annealing is 0-30 hours, the preform core rod is cooled down with the furnace after the thermal annealing is completed, and nitrogen is introduced as a protective gas during the thermal annealing.

Further, the temperature of the thermal annealing is 100-1000° C., and the time of the thermal annealing is 0.5-25 hours.

Preferably, the temperature of the thermal annealing is 200-900° C., and the time of the thermal annealing is 1-20 hours.

More preferably, the temperature of the thermal annealing is 900° C., and the time of the thermal annealing is 10 hours.

A third aspect of the present invention provides a radiation-resistant optical fiber, which is prepared by the following steps:

A1: providing a radiation-resistant laser optical fiber preform core rod;

A2: grinding and polishing the preform core rod described in the step A1, and putting it into a silica sleeve, and obtaining a single-clad optical fiber preform by a tube rod method;

A3: drawing the preform core rod described in the step A2 by a high-temperature drawing tower, and coating two layers of organic glue on the surface of the optical fiber, wherein the inner layer of organic glue with low refractive index is used as the outer layer structure of the double-clad optical fiber, and the outer layer of organic glue with high refractive index mainly plays a protective role.

In a preferred embodiment, the radiation-resistant laser optical fiber preform core rod is a silica glass comprising activating ions, co-doped ions and —OD groups, wherein the activating ions are one or a combination of $Yb^{3+}$, $Er^{3+}$, the co-doped ions are one or a combination of $Al^{3+}$, $P^{5+}$, $Ge^{4+}$, $Ce^{3+}$, and $F^-$, and the mass ratio of the —OD group in the whole substance is 5 to 150 ppm.

In another preferred embodiment, the composition range of the preform core rod is: $Yb_2O_3$: 0~0.3 mol %, $Er_2O_3$: 0~0.2 mol %, $Al_2O_3$: 0~3 mol %, $P_2O_5$: 0~5 mol %, $GeO_2$: 0~10 mol %, $Ce_2O_3$: 0~0.3 mol %, F: 0~2% mol %, $SiO_2$: 90~99 mol %.

Further, the composition range of the preform core rod is: $Yb_2O_3$: 0~0.2 mol %, $Er_2O_3$: 0~0.1 mol %, $Al_2O_3$: 1.2~2.5 mol %, $P_2O_5$: 0~2.7 mol %, $GeO_2$: 0~4 mol %, $Ce_2O_3$: 0~0.07 mol %, F: 0~1.1% mol %, $SiO_2$: 93.4~98.5 mol %.

In another preferred embodiment, the mass proportion of the —OD group in the total substance is from 16 to 118 ppm.

In another preferred embodiment, radiation induced color center concentration of powder sample of the preform core rod after being irradiated by 1700 Gy gamma rays is $1*10^{14}$ spins/mm$^3$~$150*10^{14}$ spins/mm$^3$, the mass of the powder sample is about 200 mg, and its particle size is less than 1 mm.

Further, the radiation induced color center concentration of powder sample of the preform core rod after being irradiated by 1700 Gy gamma rays is $2.1*10^{14}$ spins/mm$^3$~$120*10^{14}$ spins/mm$^3$.

In another preferred embodiment, the radiation-resistant laser optical fiber preform core rod is prepared by the following steps:

S1: providing laser optical fiber preform core rod without pre-treatment;

S2: preforming gas loading treatment on the core rod described in the step S1;

S3: performing high-energy rays pre-irradiation treatment on the preform core rod after the gas loading treatment;

S4: performing thermally annealing on the preform core rod after the pre-irradiation treatment.

In another preferred embodiment, the laser optical fiber preform core rod without pre-treatment is prepared by
1) using a Sol-Gel method combined with a vacuum sintering process; or,
2) using a modified chemical vapor deposition (MCVD) method combined with a solution doping process.

In another preferred embodiment, the gas loading is pure deuterium gas or a mixed gas of deuterium gas and other gas, the volume ratio of the deuterium gas to the mixed gas is 1%-100%, the pressure of the gas loading treatment is 1-20 MPa, the temperature of the gas loading treatment is 20-1000° C., the time of the gas loading treatment is 1-1000 hours, and the other gas is nitrogen or inert gas.

Further, the volume ratio of the deuterium gas to the mixed gas is 5%-100%, the pressure of the gas loading treatment is 5.5-15.4 MPa, the temperature of the gas loading treatment is 80-900° C., and the time of the gas loading treatment is 2-720 hours.

Preferably, the volume ratio of the deuterium gas to the mixed gas is 50%-100%, the pressure of the gas loading treatment is 5.5-10.3 MPa, the temperature of the gas loading treatment is 280-500° C., and the time of the gas loading treatment is 96-240 hours.

More preferably, the volume ratio of the deuterium gas to the mixed gas is 100%, the pressure of the gas loading treatment is 5.5 MPa, the temperature of the gas loading treatment is 280° C., and the time of the gas loading treatment is 240 hours.

In another preferred embodiment, the gas loading is a mixed gas of deuterium gas and nitrogen gas.

In another preferred embodiment, the high-energy rays are high-energy gamma (γ) rays or X-rays, the total dose of the pre-irradiation is 0-2000 kGy, and the dose rate of the pre-irradiation is 0-100 kGy/h.

Further, the total dose of the pre-irradiation is 0-1000 kGy, and the dose rate of the pre-irradiation is 0.5-58.8 kGy/h.

Preferably, the total dose of the pre-irradiation is 100-1000 kGy, and the dose rate of the pre-irradiation is 5.88-58.8 kGy/h.

More preferably, the total dose of the pre-irradiation is 1000 kGy, and the dose rate of the pre-irradiation is 58.8 kGy/h.

In another preferred embodiment, the temperature of the thermal annealing is 50-1000° C., the time of the thermal annealing is 0-30 hours, the preform core rod is cooled down with the furnace after the thermal annealing is completed, and nitrogen is introduced as a protective gas during the thermal annealing.

Further, the temperature of the thermal annealing is 100-1000° C., and the time of the thermal annealing is 0.5-25 hours.

Preferably, the temperature of the thermal annealing is 200-900° C., and the time of the thermal annealing is 1-20 hours.

More preferably, the temperature of the thermal annealing is 900° C., and the time of the thermal annealing is 10 hours.

In another preferred embodiment, the background loss of the optical fiber at a wavelength of 1200 nm after radiation with gamma rays with a dose rate of 0.34 Gy/min and a total dose of 700 Gy is 10-100 dB/km.

Further, the background loss of the optical fiber at a wavelength of 1200 nm after irradiation with gamma rays with a dose rate of 0.34 Gy/min and a total dose of 700 Gy is 70-88 dB/km.

In Summary, the Beneficial Effects of the Present Invention are:
1. In terms of composition optimization, the generation of radiation-induced aluminum-oxygen hole center (Al—OHC) is inhibited by Al—Ge co-doping, Al—P co-doping, Al—Ce co-doping and Al—P—Ce co-doping.
2. In terms of process optimization: by sequentially performing pre-treatments of deuterium loading, pre-irradiation and thermal annealing on a preform core rod, a certain content of —OD group can be introduced into the preform core rod, which can effectively inhibit the generation of radiation-induced color center and significantly improve the radiation resistance of rare earth-doped laser optical fiber preform core rod.
3. In terms of process optimization: deuterium loading and pre-irradiation treatments can adjust and control the content of the —OD group in the core rod. Because the absorption peak of the —OD group (1.26, 1.86, 2.99, 3.8 µm) moves into the longer wavelength relative to the absorption peak of the —OH group (0.95, 1.27, 1.38, 1.7~2.3, 2.7 µm). In addition, the absorption loss of the —OD group with the same content in the range of 1~1.8 µm is smaller than that of —OH group (see Journal of Lightwave technology, 1987, 5(5): 712-733 for details). Therefore, the negative effect of the —OD group with the same content on the laser performance of $Yb^{3+}$ (1.03 µm) and $Er^{3+}$ (1.55 µm) doped laser optical fiber is much smaller than that of the —OH group.
4. In terms of process optimization: the thermal annealing treatment can completely bleach the radiation induced color centers generated during the pre-irradiation process and significantly decrease the background loss of the drawn optical fiber. In addition, the thermal annealing treatment can also diffuse the deuterium gas molecules left over from chemical reactions from the preform core rod, further reducing the background loss of the drawn optical fiber, and improving the laser slope efficiency of rare earth ($Yb^{3+}$, $Er^{3+}$) doped laser optical fiber.
5. The optical fiber drawn from the radiation-resistant rare-earth doped laser optical fiber preform core rod provided by the invention has the advantages of high laser slope efficiency, low background loss, and stable use in a vacuum environment for a long time, etc.

BRIEF DESCRIPTION OF DRAWINGS

By reading the following detailed description of preferred embodiments, the solutions and advantages of this invention will become clear to those of ordinary skill in the art. The drawings are for the purpose of illustrating preferred embodiments only and are not to be considered as limiting of the invention. In the drawings.

DETAILED DESCRIPTION

Exemplary embodiments of the present disclosure will be described in more detail below in conjunction with the accompanying drawings. It should be noted that these embodiments are provided so that the present disclosure can be more thoroughly understood, and the scope of the present disclosure can be fully communicated to those skilled in the art, and the present disclosure can be implemented in various forms, and should not be limited by the embodiments described herein.

In the description of this application, "radiation resistance" contains any radiation resistance data. Specifically, in core rod glass, radiation resistance mainly relates to the radiation induced color center concentration. Under the same radiation conditions, the lower the radiation induced color center concentration in the core rod glass, the better the radiation resistance of the core rod glass. In optical fibers, the radiation resistance mainly involves optical fiber loss and laser slope efficiency. The smaller the change of optical fiber loss and the laser slope efficiency before and after radiation, the better the radiation resistance of the optical fiber. In general, the lower the radiation induced color center concentration in the glass of the preform core rod, the smaller the optical fiber loss and the higher the laser slope efficiency. In one embodiment, the radiation induced color center concentration of powder sample (mass about 200 mg, particle size less than 1 mm) of the glass of the preform core rod after being irradiated by 1700 Gy gamma rays is $1*10^{14}$ spins/mm$^3$~$150*10^{14}$ spins/mm$^3$. In another embodiment, the background loss of the optical fiber prepared from the deuterium loading pre-treated core rod glass increases by 50-70 dB/km at a wavelength of 1200 nm after being irradiated by 700 Gy gamma rays, and the laser slope decreases by 24%-36%.

Figure 1:
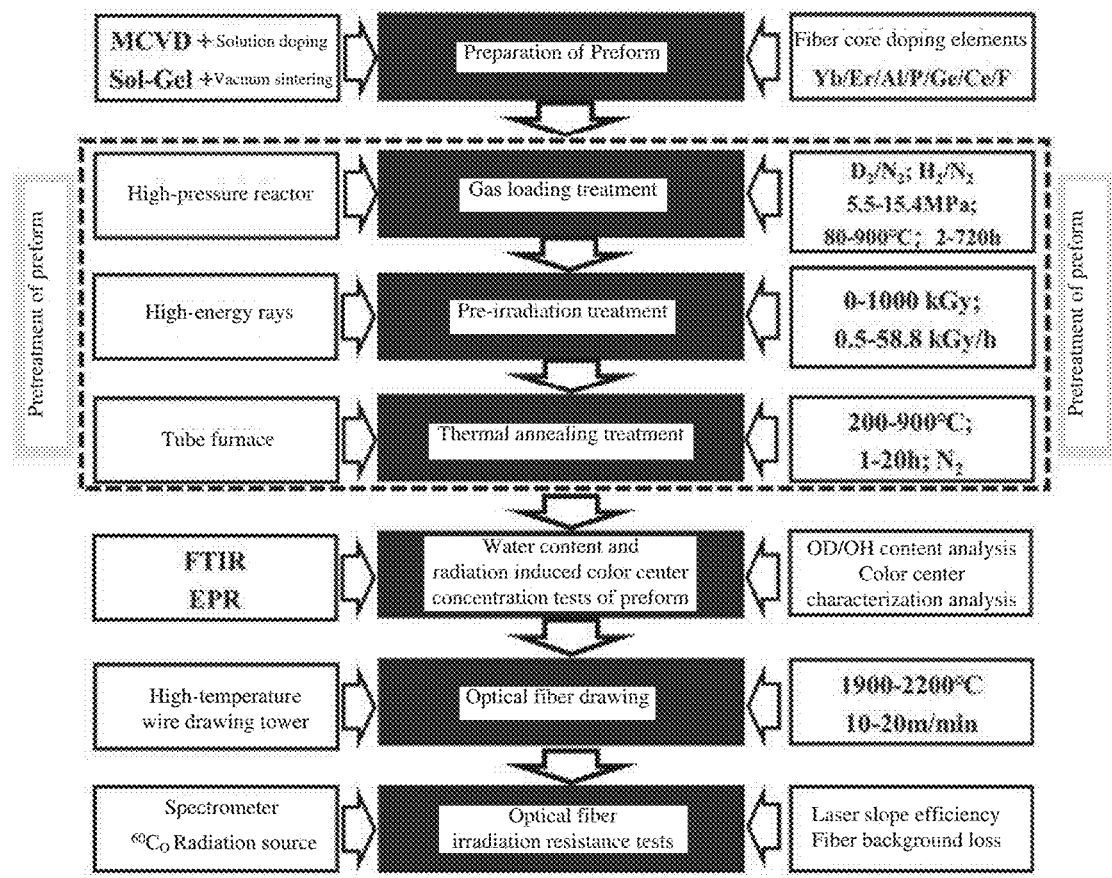
FIG. 1: Technical roadmap of the present invention.

FIG. 1 is the technical roadmap of the present invention, and the specific technical scheme is as follows:

1) Preparation of preform: Rare earth ($Yb^{3+}$, $Er^{3+}$) doped silica fiber preform core rod is prepared by Sol-Gel method combined with vacuum sintering process, or Modified Chemical Vapor Deposition (MCVD) method combined with solution soaking process;

2) Gas loading treatment of preform: a high-temperature reactor is used to treat the preform with gas loading, which is characterized in that the gas used in the gas loading is pure hydrogen, pure deuterium, or a mixed gas of deuterium gas and other gases (inert gases such as nitrogen or argon or helium), the volume ratio of deuterium to the mixed gas is not less than 5%, the pressure of the gas loading is 5.5-15.4 MPa, the temperature of the gas loading is 80-900° C., and the time of the gas loading treatment is 2-720 hours. The purpose of the gas loading is to fully diffuse hydrogen or deuterium molecules into the preform core rod glass, and to chemically react part of the deuterium ($D_2$) molecules with the core rod glass to form stable chemical bonds (such as Si—OD and Si-D bonds), thereby preventing deuterium from diffusing out of the core rod glass in the form of deuterium molecules;

3) Pre-irradiation treatment of preform: the preform after gas loading treatment is pre-irradiated with high-energy rays, which is characterized in that the irradiation source is high-energy gamma rays or X-rays, the total irradiation dose is 0-1000 kGy, and the irradiation dose rate is 0.5-58.9 kGy/h. The purpose of pre-irradiation is to efficiently promote the chemical reaction of hydrogen ($H_2$) or deuterium ($D_2$) molecules with the core rod glass to form stable chemical bonds (such as Si—OH or Si—OD), thus inhibiting the diffusion of hydrogen or deuterium molecules from the core rod glass;

4) Thermal annealing treatment of preform: a tube furnace is used to perform thermal annealing treatment on the preform after pre-irradiation, which is characterized in that the temperature of thermal annealing is 200-900° C., and the time of the thermal annealing is 1-20 hours. During the annealing process, nitrogen is introduced as a protective gas to reduce the influence of water vapor in the air on the optical properties and mechanical strength of the core rod glass. The purpose of thermal annealing is to bleach the color center induced by the pre-irradiation process, and to diffuse the hydrogen or deuterium molecules remaining in the reaction from the core rod glass, which helps to reduce the background loss of the drawn optical fiber and improve the laser slope efficiency of the active optical fiber.

5) Water content and radiation induced color center concentration tests of preform: the original and pre-treated preform are sliced and sampled respectively, and polished into 2 cm thick glass sheets for Fourier transform infrared spectroscopy (FTIR) test, and the water content (such as —OH or —OD group content) in the sample is calculated according to FTIR spectra. As shown in FIGS. 2 (*a-d*), in ordinary water ($H_2O$), the vibration peak of —OH group is mainly located at 3400 cm$^{-1}$, and in heavy water ($D_2O$), the vibration peak of —OD group is mainly located at 2500 cm$^{-1}$; in silica glass, the vibration peak of the —OH group is mainly located at 3600 cm$^{-1}$, and the vibration peak of the —OD group is mainly located at 2600 cm$^{-1}$.

Take about 200 mg of the preform core glass to grind into powder with particle size less than 1 mm, and irradiate it with gamma rays for electron paramagnetic resonance (EPR) test, and analyze the type and concentration of the radiation induced color center according to EPR spectra, as shown in FIGS. 3(*a-f*). The EPR test can simply, quickly and semi-quantitatively predict the radiation resistance of the optical fiber drawn by the preform.

6) Optical fiber drawing: according to the EPR test results, a preform with good radiation resistance is selected, and drawing the optical fiber by high-temperature wire drawing tower;

7) Optical fiber irradiation resistance test: the drawn optical fiber is irradiated with gamma rays with a total dose of 350-700 Gy (corresponding to the total radiation dose of 5-10 years in space); the laser slope efficiency and background loss of rare earth-doped silica fiber before and after irradiation are tested by spectrometer, which is used to evaluate the laser and radiation resistance of the optical fiber.

Example 1

This example includes the following steps (see FIG. 1 and Table 1):

1) Preparation of preform: The composition of core rod glass is: $0.1Yb_2O_3$-$1.2Al_2O_3$-$0.05Ce_2O_3$-$0.15F$-$98.5SiO_2$ (mol %), and the sample name is YACF. The preform was prepared by a Sol-Gel method combined with a vacuum sintering process. The detailed preparation method can refer to our earlier patents (CN103373811B and CN103864292B). Cut the preform into two sections: one section of the preform did not do any pre-treatment and was used as a reference sample, which is called the original sample; the other section of the preform was sequentially subjected to gas loading-pre-irradiation-thermal annealing treatments, which is called pre-treatment sample.

2) Gas loading treatment: the preform was treated with high temperature and high pressure gas loading by using a high temperature and high pressure reactor. The gas was a mixed gas with a volume ratio of 50% hydrogen ($H_2$) and 50% nitrogen ($N_2$). The reactor was heated to 80° C. at a certain heating rate, and the gas pressure was 12.9 MPa at this time. Keep the preform under 80° C. for 720 hours, and then cool down the preform with the furnace.

3) Pre-irradiation treatment: Gamma (γ) rays were used to pre-irradiate the preform after the gas loading. The irradiation dose rate was 5.88 kGy/h, the irradiation time was 17 h, and the total dose was 100 kGy;

4) Thermal annealing treatment: a tube furnace was used to perform thermal annealing treatment on the preform after pre-irradiation, the preform was heated to 900° C. at a certain heating rate and kept at 900° C. for 10 hours, and then cooled down with the furnace. During the annealing process, nitrogen was introduced as a protective gas to reduce the influence of water vapor in the air on the optical properties and mechanical strength of the core rod glass.

5) Preform water content and radiation induced color center concentration tests: the core rod glass was sliced and sampled, the water content in the glass was tested by Fourier transform infrared spectroscopy (FTIR), and the radiation induced color center concentration was tested by Electron paramagnetic resonance (EPR). The test results are listed in Table 1.

Figure 3A:
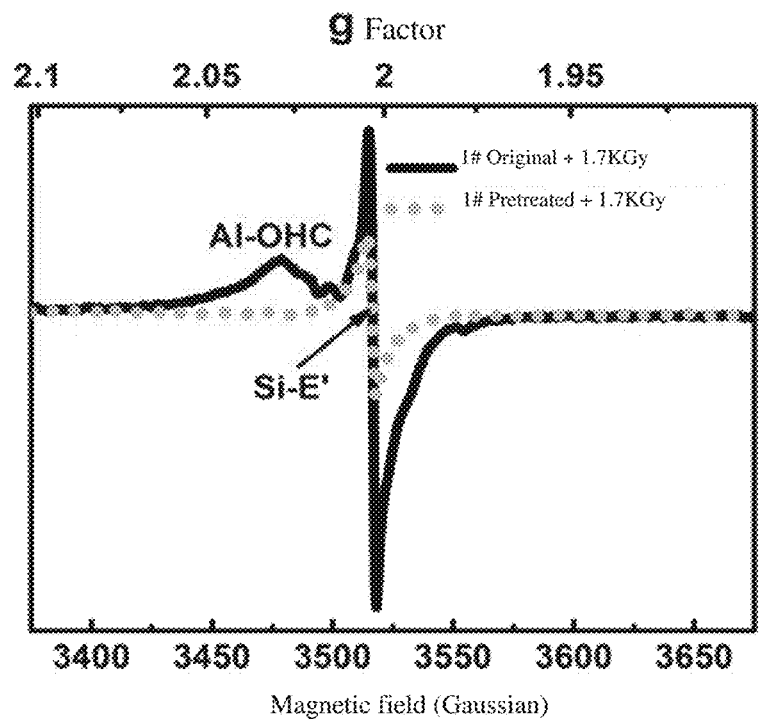
FIG. 3: Electron paramagnetic resonance (EPR) spectra of original and pre-treated core rod powder samples prepared by Example 1(a), Example 2 (B), Example 3(c), Example 4(d), Example 5(e), Example 6(f) (mass about 200 mg, particle size less than 1 mm) irradiated by 1700 Gy gamma rays.

FIG. 2 (b) is the FTIR spectra of the original sample and samples of hydrogen loaded combined with pre-irradiation under different total doses (0, 100 kGy). The radiation source was gamma rays, and the radiation time was 17 hours. According to the FTIR spectra and combined with the Lambert-Beer law, the content of the —OH group in each sample can be calculated, and the calculation results are shown in FIG. 2 (b);

FIG. 3(a) is the Electron paramagnetic resonance (EPR) spectra of the original sample and the pre-treated sample after 1700 Gy gamma radiation. The radiation dose rate was 100 Gy/h. The test samples were powder with a particle size of less than 1 mm and a mass of about 200 mg. According to FIG. 3(a), the type and concentration of radiation induced color center can be analyzed. For the original sample without pre-treatment, obvious aluminum oxygen hole center (Al—OHC) signal usually appears after gamma irradiation. For the pre-treated sample, the Al—OHC almost completely disappears after gamma irradiation, and the EPR signal intensity of other color centers also decreases significantly. Color center concentration is proportional to the twice integrals of the EPR signal. According to the tested EPR spectra, and using the spincount function of Bruker's own software, it can be calculated that the radiation induced color center concentration in the original sample ($3.6*10^{15}$ spins/mm$^3$) is an order of magnitude larger than that in the pre-treated sample ($3*10^{14}$ spins/mm$^3$).

Example 2

This example includes the following steps (see FIG. 1 and Table 1):

1) Preparation of the preform: The composition of the core rod is $0.05Er_2O_3$-$2.5Al_2O_3$-$4GeO_2$-$93.45SiO_2$ (mol %), and the sample name is EAG1. The preform was prepared by Modified Chemical Vapor Deposition (MCVD) method combined with solution doping process. The detailed preparation method can refer to our earlier patent (CN106116136B). Cut the preform into two sections: one section of the preform did not do any pre-treatment and is used as a reference sample, which is called the original sample; the other section of the preform was sequentially subjected to gas loading-pre-irradiation-thermal annealing treatments, which is called pre-treatment sample.

2) Gas loading treatment: the preform was treated with high temperature and high pressure gas loading by using a high temperature and high pressure reactor. The gas was a mixed gas composed of 95% high purity nitrogen ($N_2$) and 5% high purity deuterium ($D_2$). The reactor was heated to 900° C. at a certain heating rate, and the gas pressure was 15.4 MPa at this time. Keep the preform under 900° C. for 2 hours, and then cool down the preform with the furnace.

3) Pre-irradiation treatment: X-ray was used to pre-irradiate the preform after the gas loading. The irradiation dose rate was 0.5 kGy/h and the total dose was 1 kGy.

4) Thermal annealing treatment of the preform: a tube furnace was used to perform thermal annealing treatment on the preform after pre-irradiation, the preform was heated to 900° C. at a certain heating rate and kept at 900° C. for 1 hour, and then cooled down with the furnace. During the annealing process, nitrogen was introduced as a protective gas to reduce the influence of water vapor in the air on the optical properties and mechanical strength of the core rod glass.

5) Preform water content and radiation induced color center concentration tests: the core rod glass was sliced and sampled, the water content in the glass was tested by Fourier transform infrared spectroscopy (FTIR), and the radiation induced color center concentration was tested by Electron paramagnetic resonance (EPR). The test results are listed in Table 1.

Figure 3B:
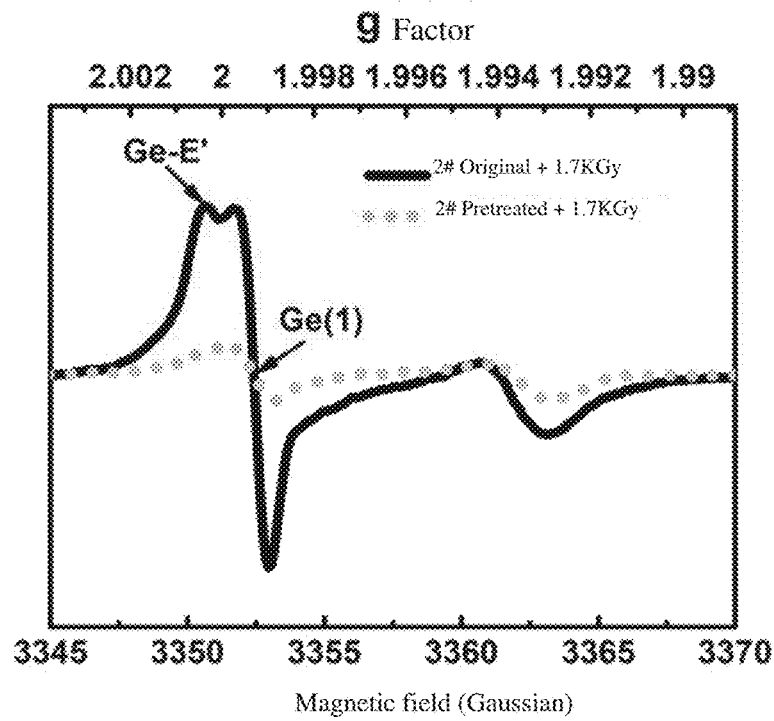

FIG. 3(b) is the Electron paramagnetic resonance (EPR) spectra of the original sample and the pre-treated sample after irradiation with 1700 Gy gamma rays. The radiation dose rate was 100 Gy/h. The test samples were powder with a particle size of less than 1 mm and a mass of about 200 mg. According to FIG. 3(b), the type and concentration of radiation induced color center can be analyzed. For the original sample without pre-treatment, obvious Ge-related color center ($Ge^{(1)}$ and Ge-E') EPR signal usually appears after gamma irradiation. For the pre-treated sample, the Ge-related color center EPR signal intensity is obviously weakened after gamma irradiation. Color center concentration is proportional to the twice integrals of the EPR signal. According to the tested EPR spectra, and using the spincount function of Bruker's own software, it can be calculated that the radiation induced color center concentration in the original sample ($1.5*10^{16}$ spins/mm$^3$) is an order of magnitude larger than that in the pretreated sample ($2.1*10^{15}$ spins/mm$^3$).

Example 3

This example includes the following steps (see FIG. 1 and Table 1):

1) Preparation of the preform: the composition of the core rod is $0.1Er_2O_3$-$2.5Al_2O_3$-$4GeO_2$-$93.4SiO_2$ (mol %), and the sample name is EAG2. The preform was prepared by Modified Chemical Vapor Deposition (MCVD) method combined with solution doping process. The detailed preparation method can refer to our earlier patent (CN106116136B). Cut the preform into two sections: one section of the preform did not do any pre-treatment and is used as a reference sample, which is called the original sample; the other section of the preform is sequentially subjected to gas loading-pre-irradiation-thermal annealing treatments, which is called pre-treatment sample.

2) Gas loading treatment: the preform was treated with high temperature and high pressure gas loading by using a high temperature and high pressure reactor. The gas was a mixed gas composed of 95% high purity nitrogen ($N_2$) and 5% high purity deuterium ($D_2$). The reactor was heated to 900° C. at a certain heating rate, and the gas pressure was 15.4 MPa at this time. Keep the preform under temperature 900° C. for 2 hours, and then cool down the preform with the furnace.

3) Pre-irradiation treatment: X-ray was used to pre-irradiate the preform after the gas loading. The irradiation dose rate was 0.5 kGy/h and the total dose was 1 kGy.

4) Thermal annealing treatment: the preform does not undergo conventional thermal annealing treatment. Considering that the preform needs to undergo reheating process in the optical fiber drawing process, thus we use hydrogen-oxygen flame to rapidly heat the preform to simulate the drawing process. Place the preform on the lamp lathe, adjust the hydrogen and oxygen flow ratio so that the hydrogen-oxygen flame temperature was between 2000-2200° C. (this temperature range is for the drawing temperature range), and the hydrogen-oxygen flame moves from one end of the preform to the other end at a speed of 60-70 mm/min. At the same time, the preform was rotated at a speed of 40-50 r/min by the lathe, in order to be heated more uniformly.

5) Preform water content and radiation induced color center concentration tests: the core rod glass was sliced and sampled, the water content in the glass was tested by Fourier transform infrared spectroscopy (FTIR), and the radiation induced color center concentration was tested by Electron paramagnetic resonance (EPR). The test results are listed in Table 1.

Figure 3C:
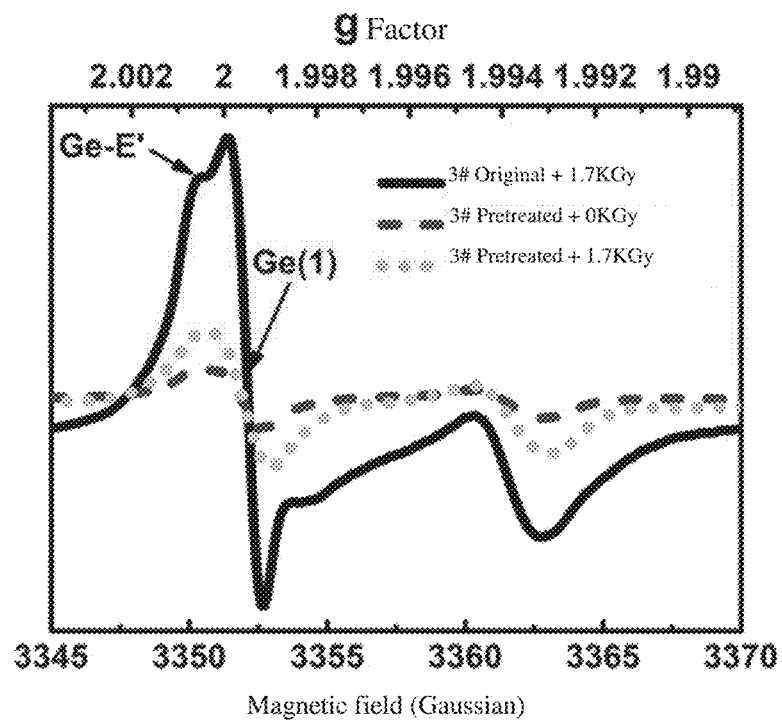

FIG. 3(c) is the Electron paramagnetic resonance (EPR) spectra of the original sample and the pre-treated sample after irradiation with 1700 Gy gamma rays. The EPR spectrum of the pre-treated sample irradiated by 0 Gy gamma ray is also added to FIG. 3(c) for comparison. The radiation dose rate was 100 Gy/h. The test samples were powder with a particle size of less than 1 mm and a mass of about 200 mg. According to FIG. 3(c), the type and concentration of radiation induced color center can be analyzed. For the original sample without pre-treatment, obvious Ge-related color centers ($Ge^{(1)}$ and Ge-E) EPR signal usually appears after 1700 Gy gamma irradiation. For the pre-treated samples, obvious Ge-related color center EPR signal can be observed during 0 Gy gamma irradiation, and the intensity of Ge-related color center EPR signal increases after 1700 Gy gamma irradiation. The concentration of the color center is proportional to the twice integrals of the EPR signal. According to the tested EPR spectra, and using the spincount function of Bruker's own software, it can be calculated that the radiation induced color center concentration in the original sample after 1700 Gy gamma irradiation ($1.7*10^{16}$ spins/mm$^3$) is one order of magnitude larger than that in the pre-treated samples after 1700 Gy gamma radiation ($4.3*10^{15}$ spins/mm$^3$).

The core rod glass composition, gas loading and pre-irradiation conditions of Example 2 and Example 3 were substantially consistent. The difference between the two is that in Example 2, the preform was subjected to a thermal annealing treatment, while in Example 3, the preform was not subjected to a conventional thermal annealing treatment. The final result is: after 1700 Gy gamma radiation, the radiation induced color center concentration ($4.3*10^{15}$ spins/mm$^3$) in the pretreated sample of Example 3 is more than two times greater than the irradiation induced color center concentration ($2.1*10^{15}$ spins/mm$^3$) in the pretreated sample of Example 2.

For the pre-treated sample in Example 3, although the preform has been subjected to an over-rapid heat treatment using a hydrogen-oxygen flame simulation wire drawing process, the EPR test then shows that the radiation induced color center concentration in the pre-treated sample with 0 Gy gamma radiation has reached up to $1.8*10^{15}$ spins/mm$^3$, as shown in FIG. 3(c). This indicates that the radiation induced color center generated in the pre-irradiation process of the pre-treated samples cannot be completely bleached during the subsequent rapid heating process (such as in the wire drawing process), so the pre-irradiated sample must be subjected to precise thermal annealing treatment.

Example 4

This example includes the following steps (see FIG. 1 and Table 1):

1) Preparation of the preform: the composition of core rod is $0.2Yb_2O_3-1.9Al_2O_3-2.7P_2O_5-0.7F-94.5SiO_2$ (mol %), and the sample name is YAPF1.

The preform was prepared by Modified Chemical Vapor Deposition (MCVD) method combined with solution doping process. The detailed preparation method can refer to our earlier patent (CN106116136B). Cut the preform into two sections: one section of the preform did not do any pretreatment and was used as a reference sample, which is called the original sample; the other section of the preform was sequentially subjected to gas loading-pre-irradiation-thermal annealing treatments, which is called pre-treatment sample.

2) Gas loading treatment: the preform was treated with high temperature and high pressure gas loading by using a high temperature and high pressure reactor. The gas was 100% high purity nitrogen ($N_2$). The reactor was heated to 900° C. at a certain heating rate, and the gas pressure was 15 MPa at this time. Keep the preform under temperature 900° C. for 2 hours, and then cool down the preform with the furnace. 3) Pre-irradiation treatment: γ-ray was used to pre-irradiate the preform after the gas loading. The irradiation dose rate was 58.8 kGy/h, the irradiation time was 17 h, and the total dose was 1000 kGy.

4) Thermal annealing treatment: a tube furnace was used to perform thermal annealing treatment on the preform after pre-irradiation, the preform was heated to 900° C. at a certain heating rate, and kept at 900° C. for 10 hours, and then cooled down with the furnace. During the annealing process, nitrogen was introduced as a protective gas to reduce the influence of water vapor in the air on the optical properties and mechanical strength of the core rod glass.

5) Preform water content and radiation induced color center concentration tests: the core rod glass was sliced and sampled, the water content in the glass was tested by Fourier transform infrared spectroscopy (FTIR), and the radiation induced color center concentration was tested by Electron paramagnetic resonance (EPR). The test results are listed in Table 1.

Figure 3D:
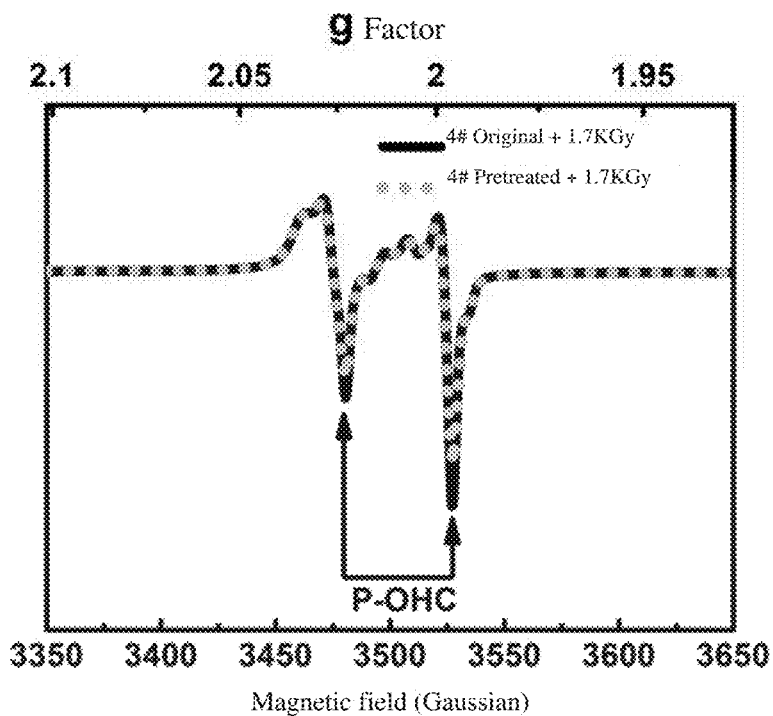

FIG. 3(d) is the Electron paramagnetic resonance (EPR) spectra of the original sample and the pre-treated sample after irradiation with 1700 Gy gamma rays. The radiation dose rate was 100 Gy/h. The test samples were powder with a particle size of less than 1 mm and a mass of about 200 mg. According to FIG. 3(d), the type and concentration of radiation induced color center can be analyzed. For the original sample without pre-treatment, obvious phosphorus-oxygen hole center (P—OHC) signal usually appears after gamma irradiation. For the pre-treated sample, the EPR signal intensity of P—OHC after gamma irradiation does not decrease significantly. The concentration of the color center is proportional to the twice integrals of the EPR signal. According to the tested EPR spectra, and using the spincount function of Bruker's own software, it can be calculated that the radiation induced color center concentration in the original sample ($1.3*10^{16}$ spins/mm$^3$) is equivalent to that in the pre-treated sample ($1.2*10^{16}$ spins/mm$^3$).

It can be seen from the combination of Examples 1 to 4 that reducing gas (such as $H_2$ or $D_2$) must be used in the gas loading process to improve the radiation resistance of the preform core rod.

Example 5

This example includes the following steps (see FIG. 1 and Table 1):

1) Preparation of the preform: the composition of core rod is $0.2Yb_2O_3-1.9Al_2O_3-2.6P_2O_5-0.9F-94.4SiO_2$ (mol %), and the sample name is YAPF2. The preform was prepared by Modified Chemical Vapor Deposition (MCVD) method combined with solution doping process. The detailed preparation method can refer to our earlier patent (CN106116136B). Cut the preform into two sections: one section of the preform did not do any pretreatment and was used as a reference sample, which is called the original sample; the other section of the preform was sequentially subjected to gas loading-pre-irradiation-thermal annealing treatments, which is called pre-treatment sample.

2) Gas loading treatment: the preform was treated with high temperature and high pressure gas loading by using a high temperature and high pressure reactor. The gas was a mixed gas composed of 50% high purity nitrogen ($N_2$) and 50% high purity deuterium ($D_2$). The reactor was heated to 500° C. at a certain heating rate, and the gas loading pressure is 10.3 MPa at this time. Keep the preform under the temperature 500° C. for 96 hours, and then cool down the preform with the furnace.

3) Pre-irradiation treatment: the preform was not pre-irradiated.

4) Thermal annealing treatment: a tube furnace was used to perform thermal annealing treatment on the preform after the gas loading, the temperature of thermal annealing was 200° C., and the time of the thermal annealing is 20 hours. During the annealing process, nitrogen was introduced as a protective gas to reduce the influence of water vapor in the air on the optical properties and mechanical strength of the core rod glass.

5) Preform water content and radiation induced color center concentration tests: the core rod glass was sliced and sampled, the water content in the glass was tested by Fourier transform infrared spectroscopy (FTIR), and the radiation induced color center concentration was tested by Electron paramagnetic resonance (EPR). The test results are listed in Table 1.

Figure 2A:
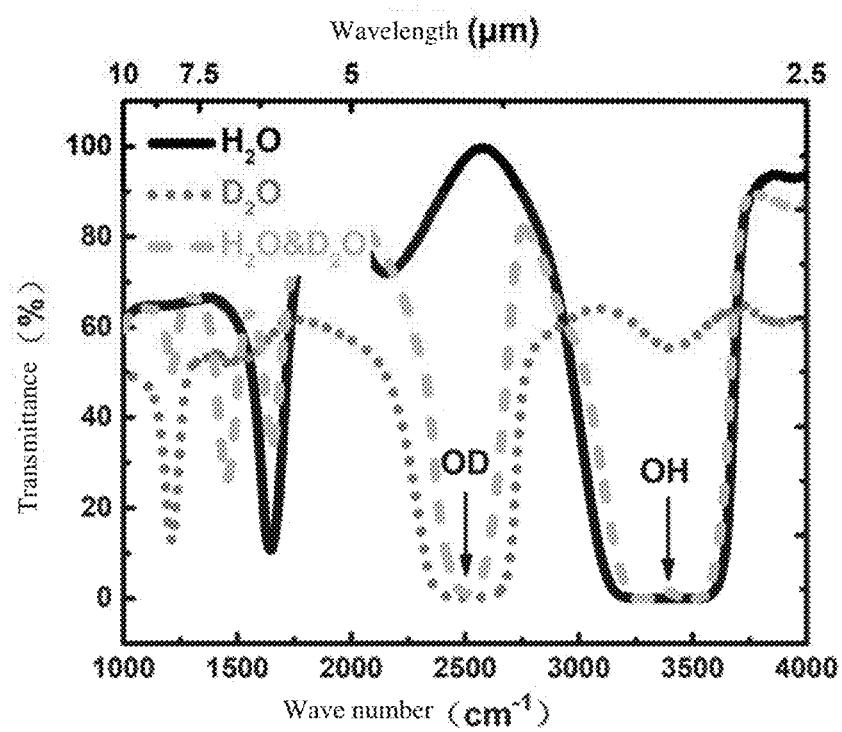
FIG. 2: (a) Fourier transform infrared transmission (FTIR) spectra of ordinary water ($H_2O$), heavy water ($D_2O$), mixed water ($H_2O$ & $D_2O$); (b) FTIR spectra of the original sample prepared in Example 1 and the sample of hydrogen-loaded combined with different doses of pre-irradiation; (c) FTIR spectra of the original sample prepared in Example 5 and the deuterium-loaded sample; (d) FTIR spectra of the original sample prepared in Example 6 and the sample of deuterium-loaded combined with different doses of pre-irradiation.
Figure 2B:
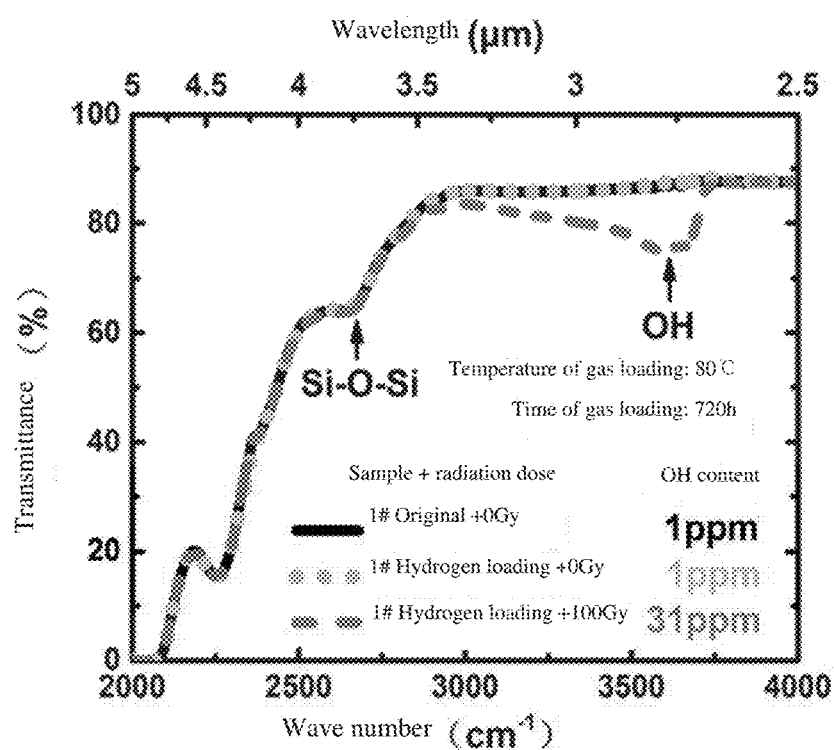
Figure 2C:
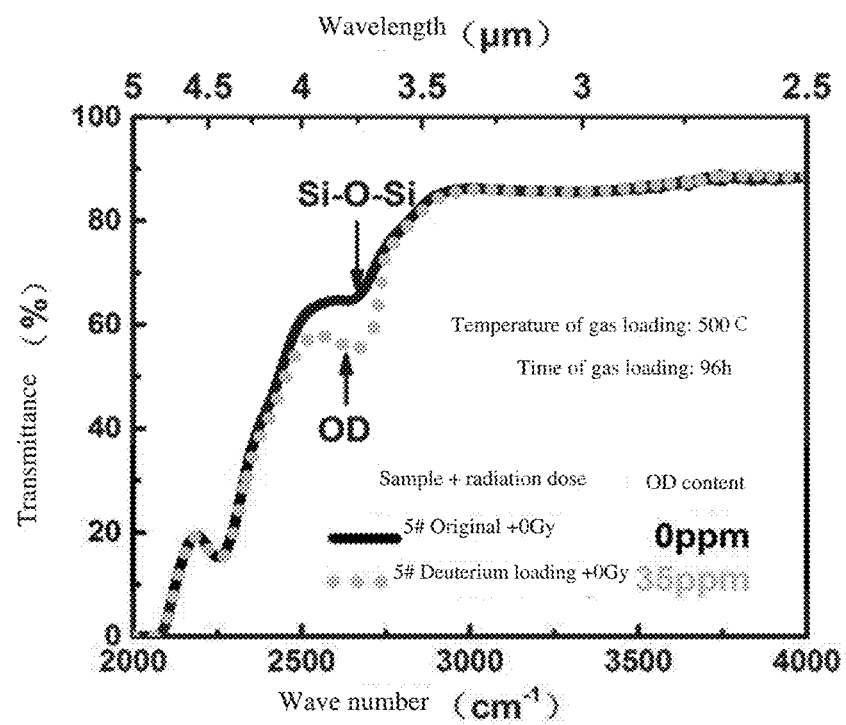

FIG. 2(c) is the FTIR spectra of the original sample and sample of high temperature (500° C.) deuterium loading. Neither sample was pre-irradiated. According to FTIR spectra and Lambert-Beer law, the content of —OD group in each sample can be calculated. The calculation results show that the OD content in the original sample is 0 ppm and the OD content in the deuterium loaded sample is 35 ppm. This result indicates that deuterium loading at 500° C. can promote the chemical reaction between deuterium gas and the preform to generate stable chemical bonds (Si—OD).

Figure 3E:
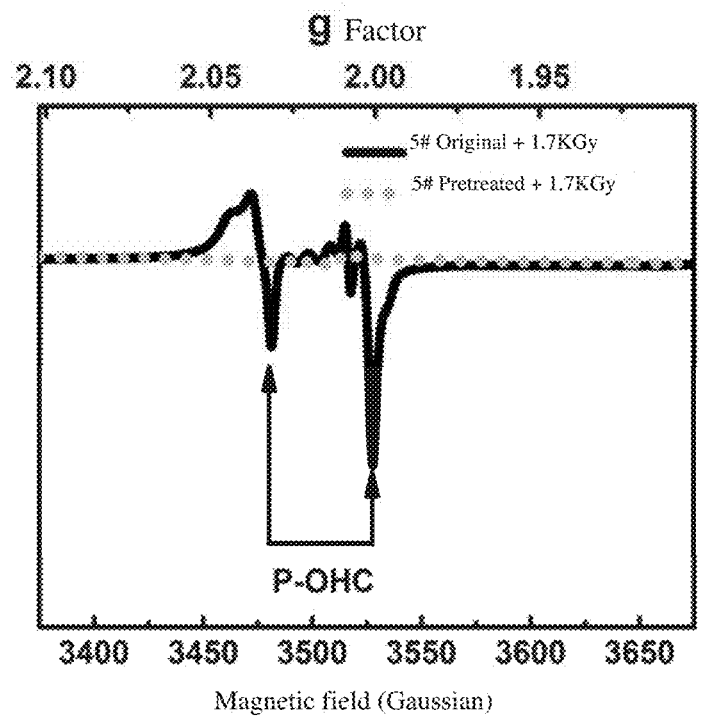
Figure 3F:
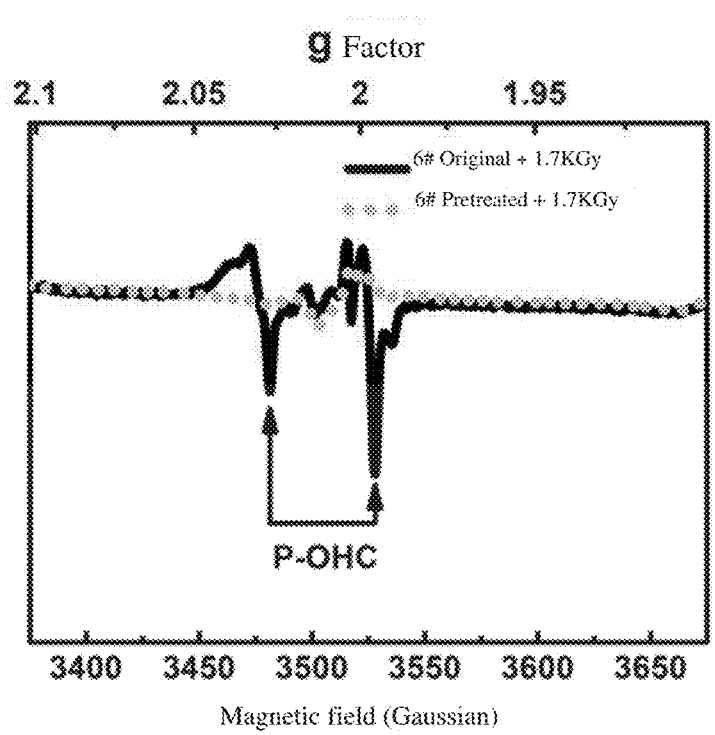

FIG. 3(e) is the Electron paramagnetic resonance (EPR) spectra of the original sample and the deuterium loaded pre-treated sample after irradiation with 1700 Gy gamma rays. The radiation dose rate was 100 Gy/h. The test samples were powder with a particle size of less than 1 mm and a mass of about 200 mg. According to FIG. 3(e), the type and concentration of radiation induced color center can be analyzed. For the original sample without pre-treatment, obvious phosphorus-oxygen hole center (P—OHC) signal usually appears after gamma irradiation. For the pre-treated sample, the P—OHC completely disappears after gamma irradiation, and the EPR signal intensity of other color centers also decreases significantly. Color center concentration is proportional to the twice integrals of the EPR signal. According to the tested EPR spectra, and using the spincount function of Bruker's own software, it can be calculated that the radiation induced color center concentration in the original sample ($1.3*10^{16}$ spins/mm$^3$) is an order of magnitude larger than that in the pre-treated sample ($8.9*10^{14}$ spins/mm$^3$).

Example 6

This example includes the following steps (see FIG. 1 and Table 1):

1) Preparation of the preform: the composition of core rod is $0.13Yb_2O_3$-$1.9Al_2O_3$-$2.6P_2O_5$-$0.07Ce_2O_3$-$1.1F$-$94.2SiO_2$ (mol %), and the sample name is YAPCF. The preform was prepared by Modified Chemical Vapor Deposition (MCVD) method combined with solution doping process. The detailed preparation method can refer to our earlier patent (CN106116136B). Cut the preform into two sections: one section of the preform did not do any pretreatment and was used as a reference sample, which is called the original sample; the other section of the preform was sequentially subjected to gas loading-pre-irradiation-thermal annealing treatments, which is called pre-treatment sample.

2) Gas loading treatment: the preform was treated with high temperature and high pressure gas loading by using a high temperature and high pressure reactor. The gas was 100% high purity deuterium ($D_2$). The reactor was heated to 280° C. at a certain heating rate, and the gas pressure is 5.5 MPa at this time. Keep the preform under 280° C. for 240 hours, and then cool down the preform with the furnace.

3) Pre-irradiation treatment: Gamma (γ) ray was used to pre-irradiate the preform after the gas loading. The irradiation dose rate was 58.8 kGy/h and the total dose was 1000 kGy.

4) Thermal annealing treatment: a tube furnace was used to perform thermal annealing treatment on the preform after pre-irradiation, the preform was heated to 900° C. at a certain heating rate, and kept at 900° C. for 10 hours, and then cooled down with the furnace. During the annealing process, nitrogen was introduced as a protective gas to reduce the influence of water vapor in the air on the optical properties and mechanical strength of the core rod glass.

5) Preform water content and radiation induced color center concentration tests: the core rod glass was sliced and sampled, the water content in the glass was tested by Fourier transform infrared spectroscopy (FTIR), and the radiation induced color center concentration was tested by Electron paramagnetic resonance (EPR). The test results are listed in Table 1.

Figure 2D:
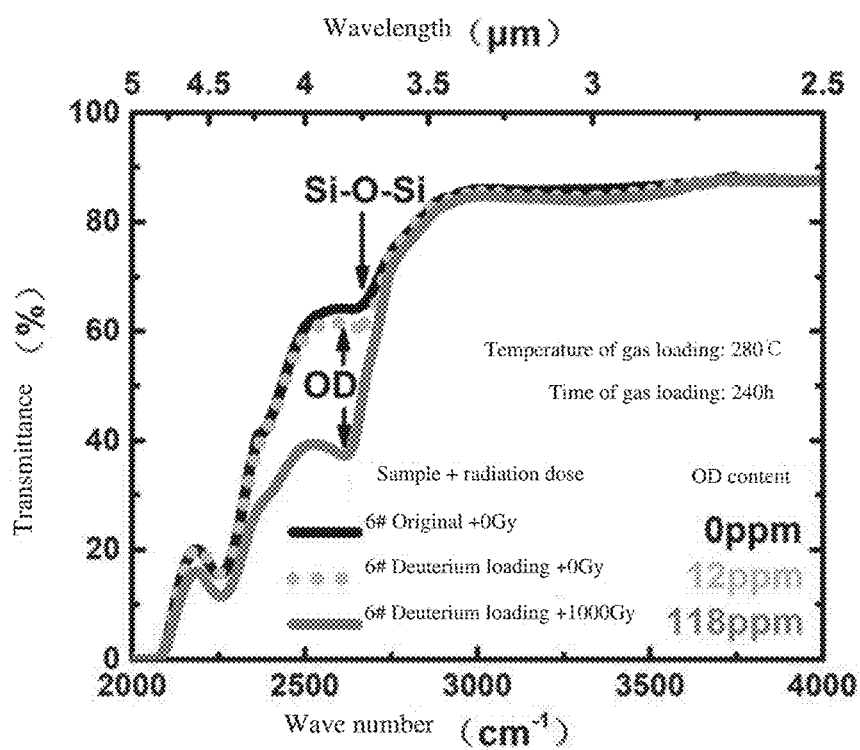

FIG. 2(d) is the FTIR spectra of the original sample and sample of high temperature (280° C.) hydrogen loaded combined pre-irradiated with different total doses (0, 1000 kGy). The radiation source was gamma rays, and the radiation time was 17 hours. According to FTIR spectra and Lambert-Beer law, the content of —OD groups in each sample can be calculated, and the calculation results are shown in FIG. 2(d). As can be seen from FIG. 2(d), the content of —OD group in the original sample is 0 ppm, and the content of —OD group in the high-temperature (280° C.) deuterium loaded 0 kGy radiation sample is 12 ppm, this shows that deuterium loading at 280° C. can promote the chemical reaction between deuterium gas and core rod glass to form stable chemical bonds (Si—OD).

Comparing FIGS. 2(c) and 2(d), it can be seen that the higher the temperature, the shorter the time required to form stable chemical bonds (Si—OD) with the same content during the high temperature (≥280° C.) gas loading process. As can be seen from FIG. 2 (b), in the process of gas loading at low temperature (≤80° C.), $H_2$ or $D_2$ hardly reacts with core rod glass to form Si—OH or Si—OD bonds.

FIG. 3(e) is the Electron paramagnetic resonance (EPR) spectra of the original sample and the pre-treated sample after irradiation with 1700 Gy gamma rays. The radiation dose rate was 100 Gy/h. The test samples were powder with a particle size of less than 1 mm and a mass of about 200 mg. According to FIG. 3(e), the type and concentration of radiation induced color center can be analyzed. For the original sample without pre-treatment, obvious phosphorus-oxygen hole center (P—OHC) signal usually appears after gamma irradiation. For the pre-treated sample, the P—OHC completely disappears after gamma irradiation, and the EPR signal intensity of other color centers also decreases significantly. The concentration of the color center is proportional to the twice integrals of the EPR signal. According to the tested EPR spectrum, and using the spincount function of Bruker's own software, it can be calculated that the radiation induced color center concentration in the original sample ($3.2*10^{15}$ spins/mm$^3$) is an order of magnitude larger than that in the pre-treated sample ($2.1*10^{14}$ spins/mm$^3$).

curves of the laser are tested. The length of the tested optical fiber is 5 m. The test results are shown in FIGS. 4(c) and (d).

The test results show that the laser efficiency of the pre-treated optical fiber (19.7%) is significantly lower than that of the original optical fiber (37%) before irradiation. This is due to the fact that a large number of hydroxyl groups are generated by hydrogen-loaded combined with pre-irradiation treatments, resulting in a significant increase in the background loss of the pre-treated optical fiber relative to the original optical fiber (0.47 dB/m→0.85 dB/m @ 1200 nm).

After 700 Gy gamma ray irradiation, the laser efficiency of the original optical fiber decreases by 65 percentage points (37%→13%), while the laser efficiency of the pre-treated optical fiber decreases by only 10 percentage points

TABLE 1

Summary of Pre-treatment Process Parameters, Water Content and Radiation induced Color Center Concentration of Preforms in Examples 1-6

| | | Example No. | | | | | |
|---|---|---|---|---|---|---|---|
| | | 1 | 2 | 3 | 4 | 5 | 6 |
| Sample name | | YACF | EAG1 | EAG2 | YAPF1 | YAPF2 | YAPCF |
| Sample preparation method | | Sol-Gel | MCVD | MCVD | MCVD | MCVD | MCVD |
| Gas loading | Gas (%) | 50H$_2$—50N$_2$ | 5D$_2$—95N$_2$ | 5D$_2$—95N$_2$ | 100N$_2$ | 50D$_2$—50N$_2$ | 100D$_2$ |
| | Temperature (° C.) | 80 | 900 | 900 | 900 | 500 | 280 |
| | Pressure (MPa) | 12.9 | 15.4 | 15.4 | 15 | 10.3 | 5.5 |
| | Time (hours) | 720 | 2 | 2 | 2 | 96 | 240 |
| Pre-irradiation | Ray source | γ | X | X | γ | No | γ |
| | Total dose (kGy) | 100 | 1 | 1 | 1000 | No | 1000 |
| | Dose rate (kGy/h) | 5.88 | 0.5 | 0.5 | 58.8 | No | 58.8 |
| Thermal annealing | Temperature (° C.) | 900 | 900 | No | 900 | 200 | 900 |
| | Time (hours) | 10 | 1 | No | 10 | 20 | 10 |
| OH(OD) content (ppm) | | 31@OH | 16@OD | 16@OD | 1@OH | 35@OD | 118@OD |
| Radiation induced color center concentration (*10$^{14}$ spins/mm$^3$) | | 3 | 21 | 43 | 120 | 9 | 2 |

Application Example 1: Low Temperature (80° C.) Hydrogen Loading-Pre-Irradiation-Thermal Annealing Pre-Treatments Improve the Radiation Resistance of Yb—Al—Ce—F (YACF) Co-Doped Silica Fiber The two core rod glasses prepared in Example 1 (original sample and pre-treated sample) are ground and polished as required and put into silica sleeves respectively, and single-clad optical fiber preforms are obtained by using the tube rod method. The preforms are drawn at 2000° C. by a high-temperature drawing tower, and two layers of organic glue are coated on the surface of the optical fiber, wherein the inner layer of organic glue with low refractive index is used as the outer layer structure of the double-clad optical fiber, and the outer layer of organic glue with high refractive index mainly plays a protective role. The optical fibers drawn from the original core rod and the pretreated core rod are irradiated with gamma rays with a dose rate of 0.34 Gy/min and a total dose of 700 Gy. The laser slope efficiency and loss spectra of the two optical fibers before and after irradiation are measured.

Figure 4A:
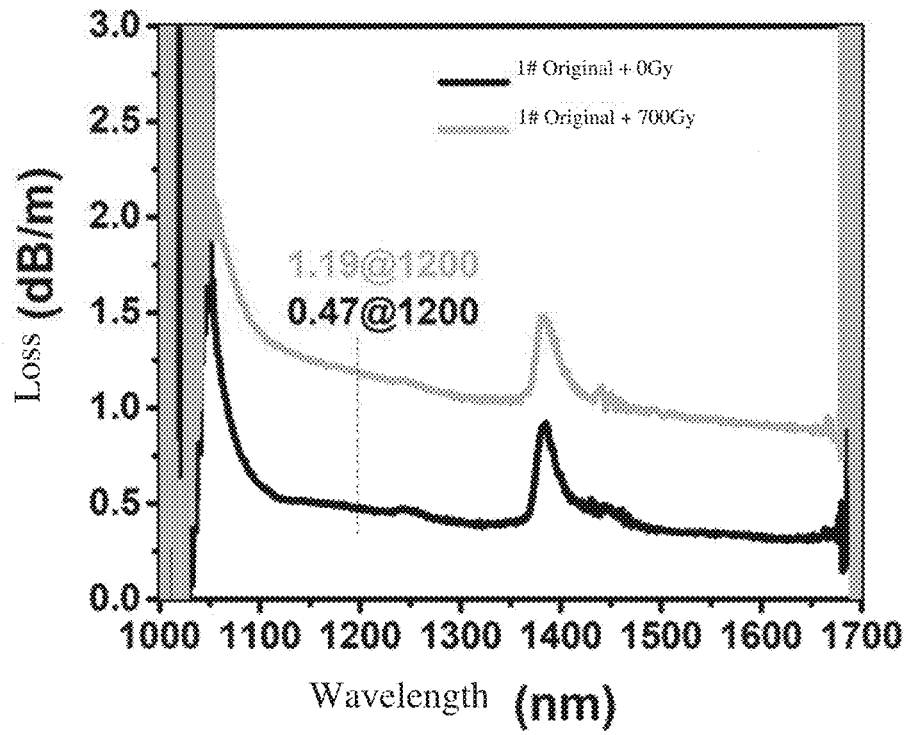
FIG. 4: Loss spectra (a, b) and laser slope efficiency (c, d) of original samples (a, c) and pre-treated samples (b, d) of Yb—Al—Ce—F (YACF) co-doped silica fibers prepared by Example 1 after irradiation with different doses of gamma rays.
Figure 4B:
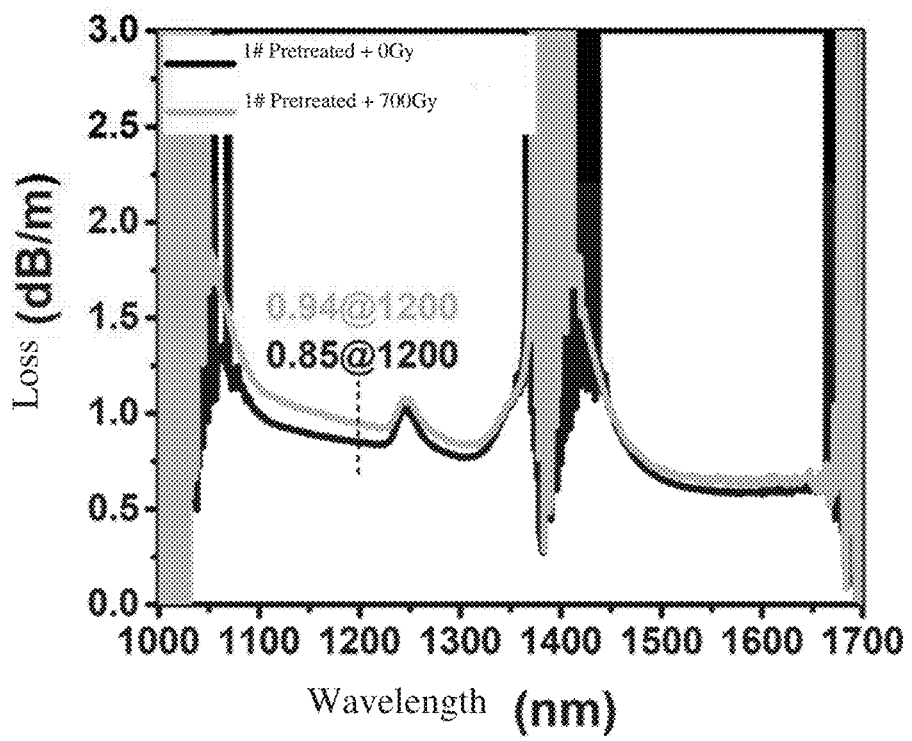
Figure 4C:
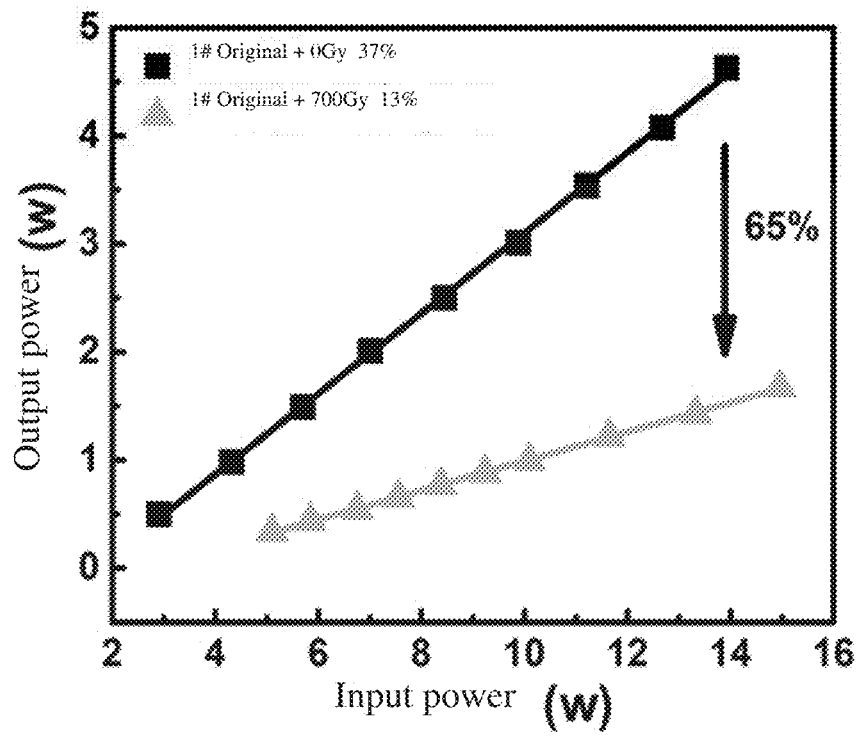
Figure 4D:
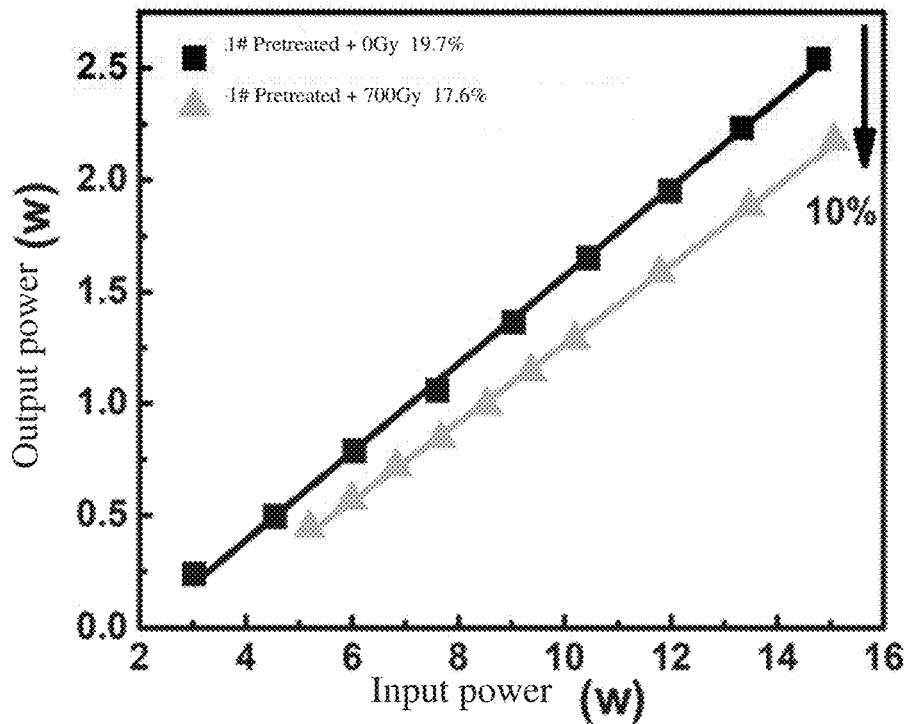

The truncation method is used to test the optical fiber loss, and the test results are shown in FIGS. 4(a) and (b).

A semiconductor laser with a wavelength of 970 nm is used to pump the optical fibers, and the input and output (19.7%→17.6%). The background losses of the original optical fiber and the pre-treated optical fiber at the wavelength of 1200 nm are 1.19 and 0.94 dB/m, respectively.

This comparative experiment shows that hydrogen loading-pre-irradiation-thermal annealing pre-treatments can significantly improve the radiation resistance of the optical fiber, but at the same time, it will also have a significant negative impact on the laser performance of ytterbium-doped (Yb$^{3+}$) silica fiber. This pre-treatment method is not recommended in the actual production process.

Application Example 2: High Temperature (500° C.) Deuterium-Loading Pre-Treatments Improve the Radiation Resistance of Yb—Al—P—F (YAPF2) Co-Doped Silica Fiber After the two core rod glasses prepared in Example 5 (original sample and pretreated sample) are sleeved and are processed into octagons, and the two preforms are drawn at 1900° C. by a high-temperature drawing tower, and two layers of organic glue are coated on the surface of the optical fiber, wherein the inner layer of organic glue with low refractive index is used as the outer layer structure of the double-clad optical fiber, and the outer layer of organic glue with high refractive index mainly plays a protective role.

The original optical fiber and the pre-treated optical fiber are irradiated with gamma rays with a dose rate of 0.34

Gy/min and a total dose of 0, 350, and 700 Gy. The laser slope efficiency and loss spectra of the two optical fibers before and after irradiation are measured.

Figure 5A:
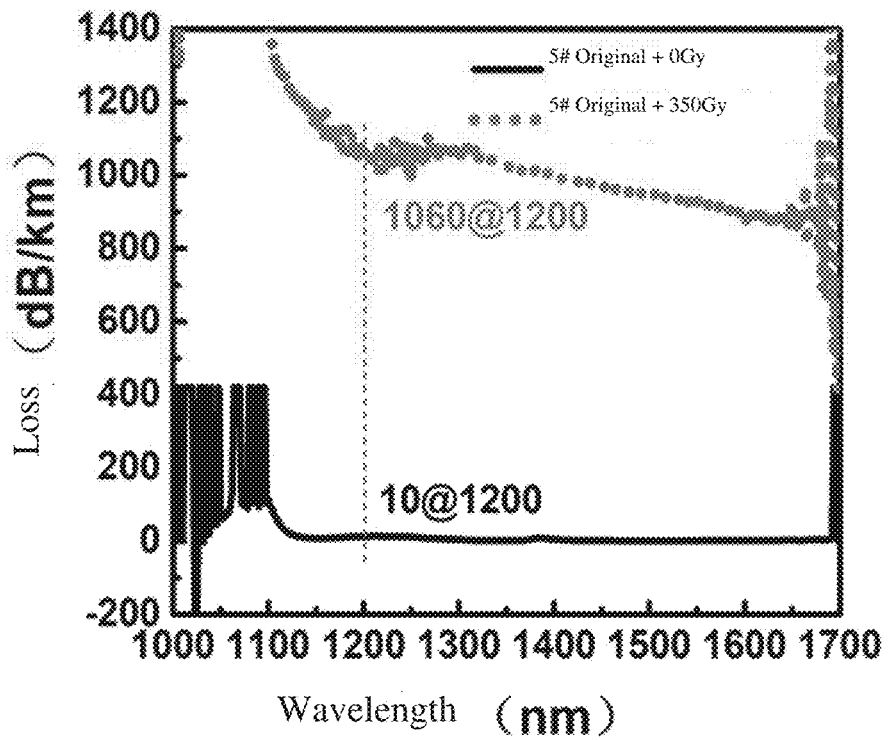
FIG. 5: Loss spectra (a, b) and laser slope efficiency (c, d) of original samples (a, c) and pretreated samples (b, d) of Yb—Al—P—F (YAPF2) co-doped silica fibers prepared by Example 5 after irradiation with different doses of gamma rays.
Figure 5B:
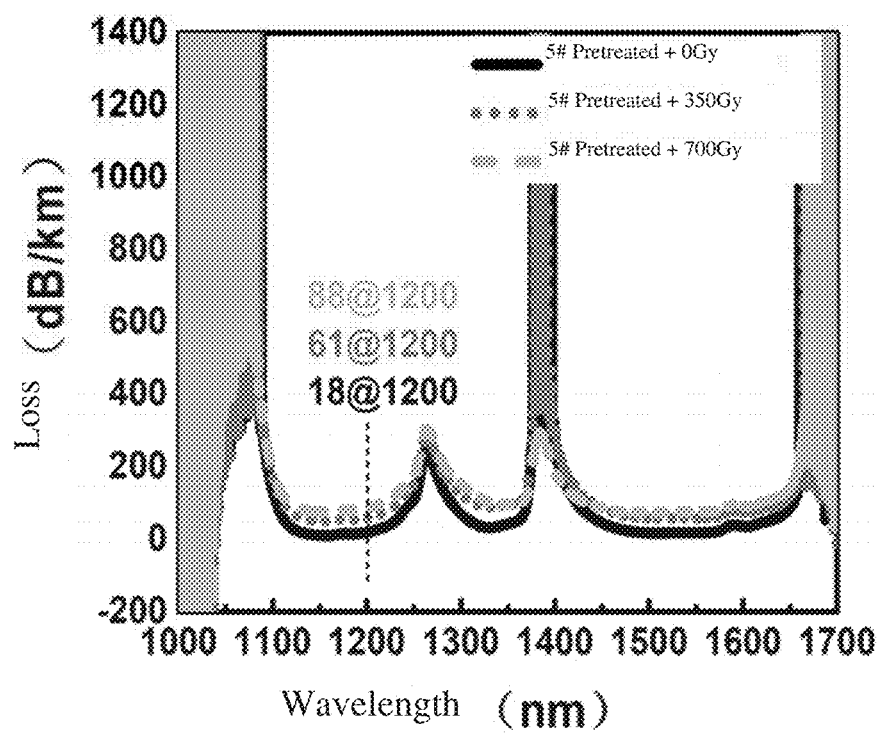

The truncation method is used to test the optical fiber loss, and the test results are shown in FIGS. 5(a) and (b).

Figure 5C:
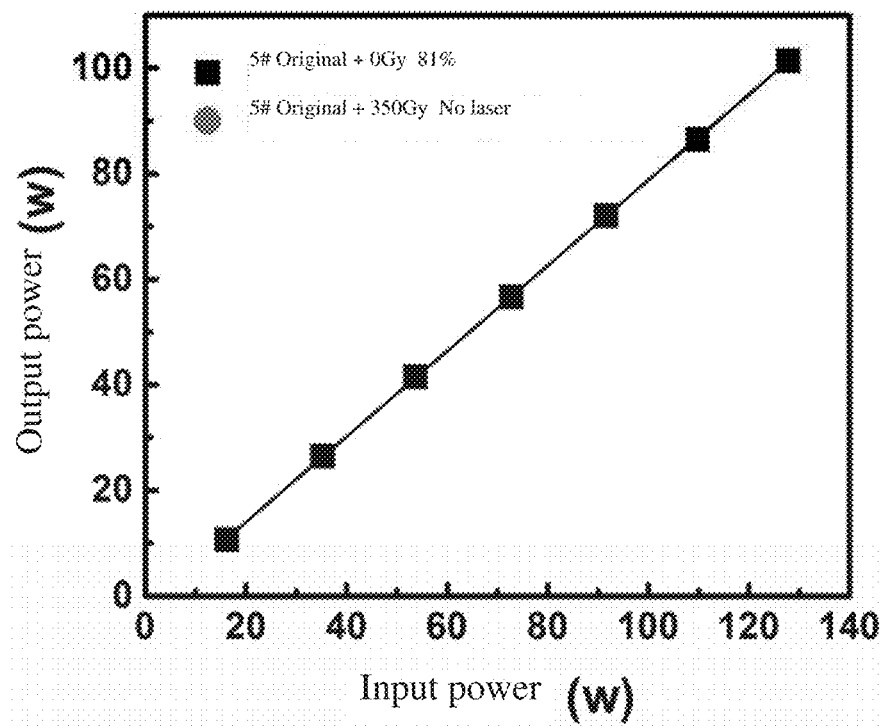
Figure 5D:
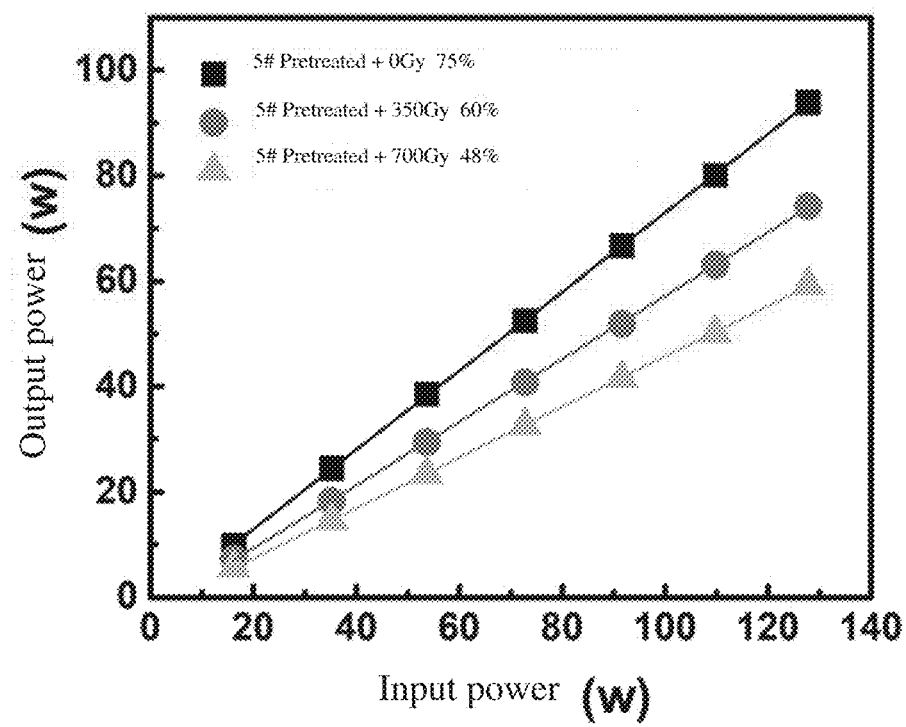
Figure 6A:
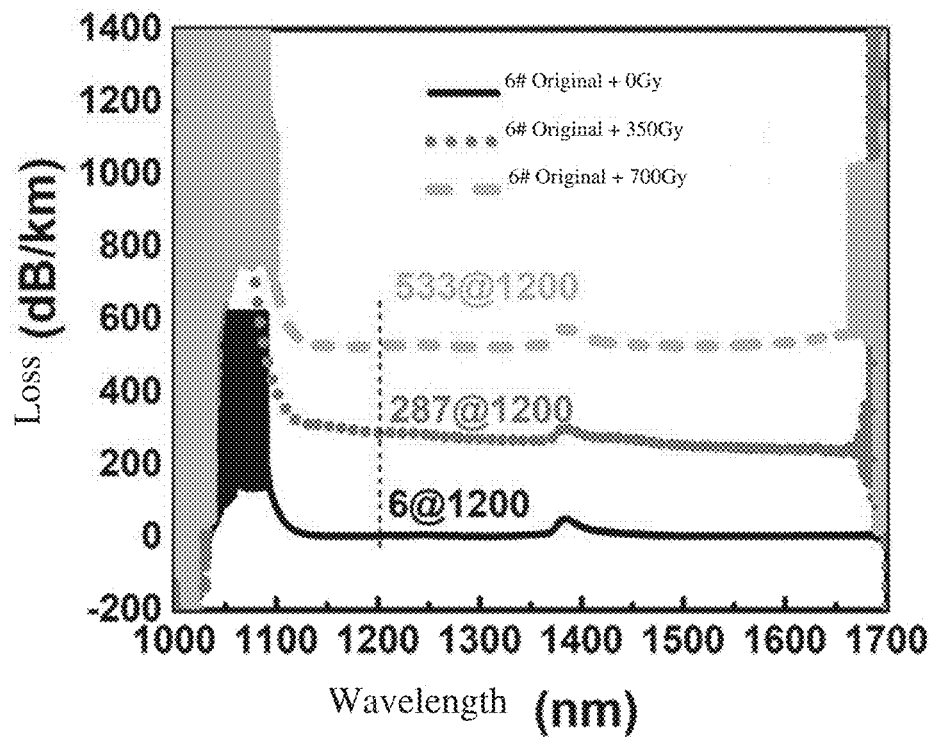
FIG. 6: Loss spectra (a, b, c) and laser slope efficiency (d, e, f) of original samples (a, d), pre-treated samples (b, e) and pre-treatment combined with vacuum treated samples (c, f) of Yb—Al—P—Ce—F (YAPCF) co-doped silica fibers prepared by Example 6 after irradiation with different doses of gamma rays.
Figure 6B:
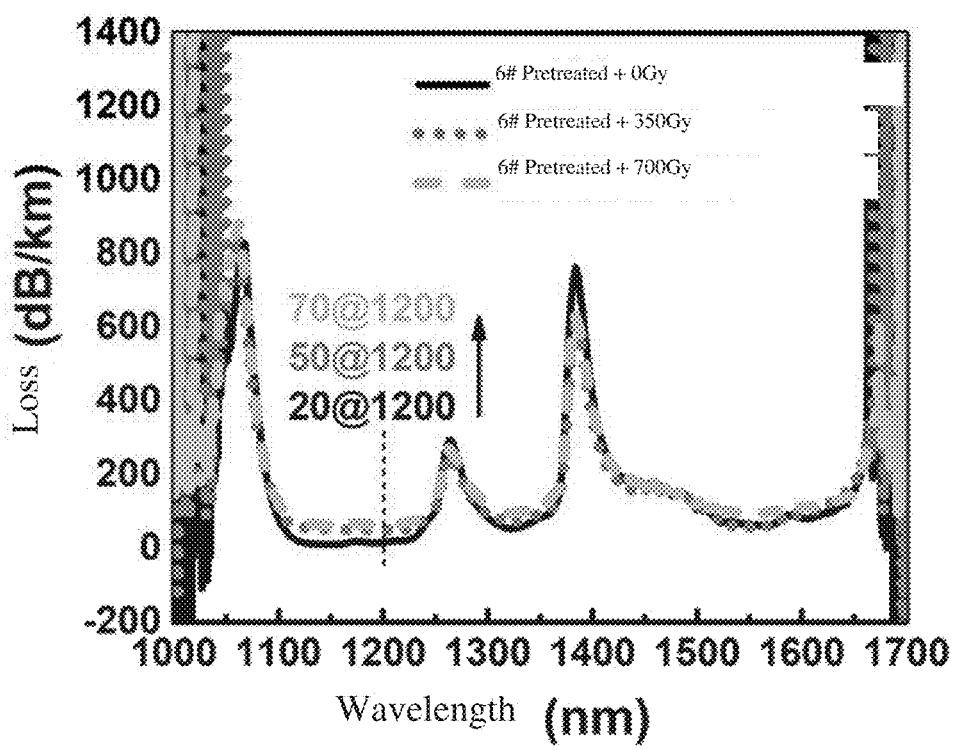
Figure 6C:
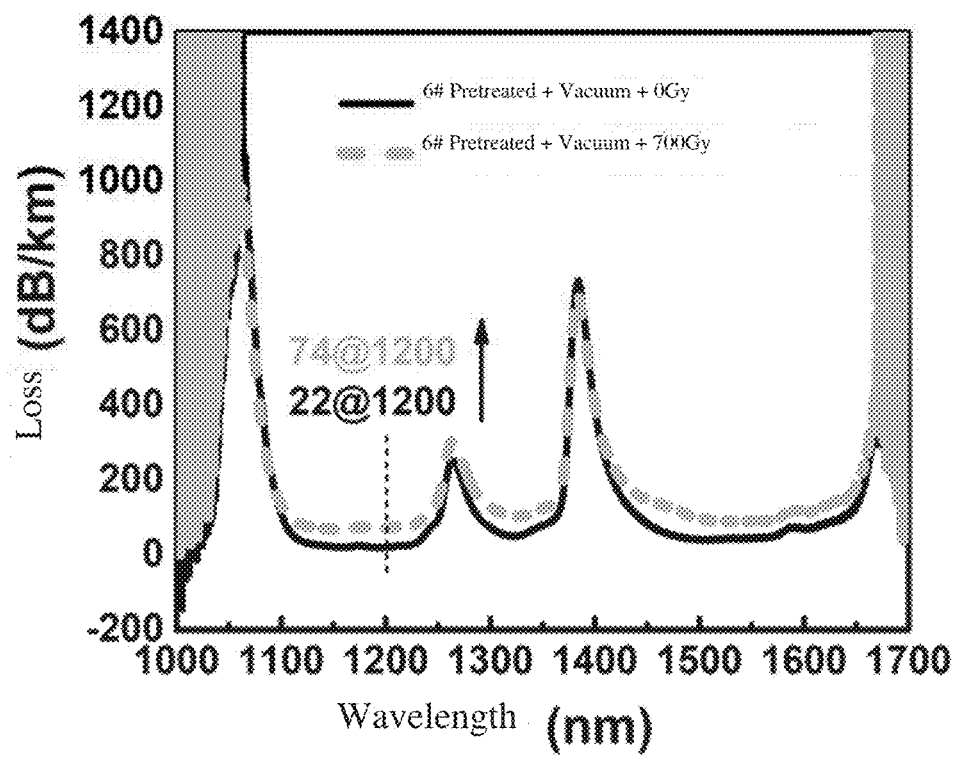
Figure 6D:
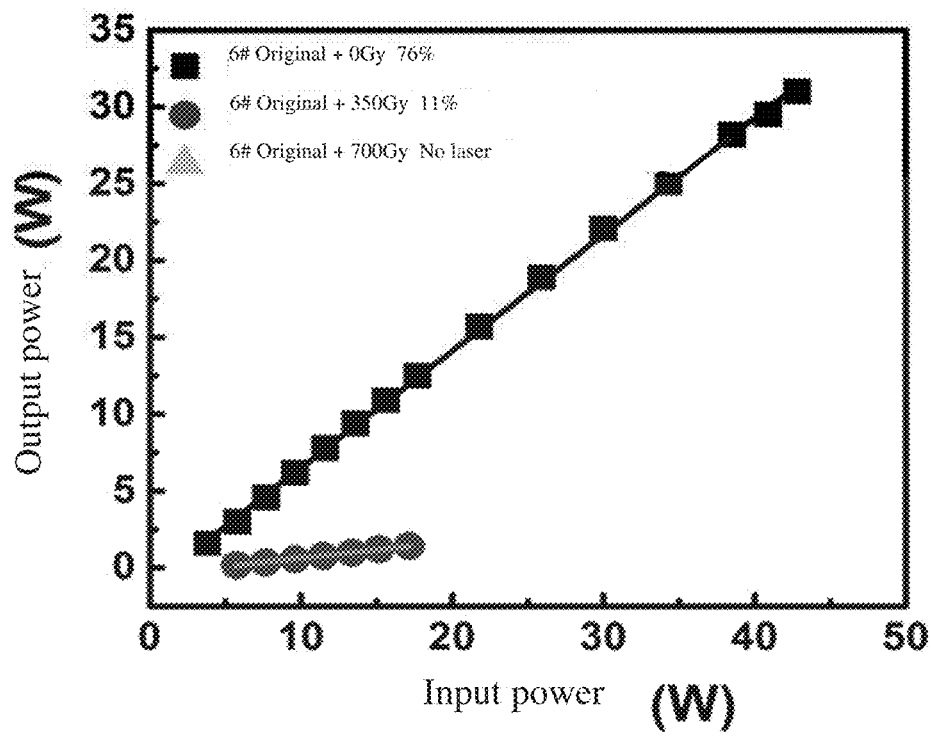
Figure 6E:
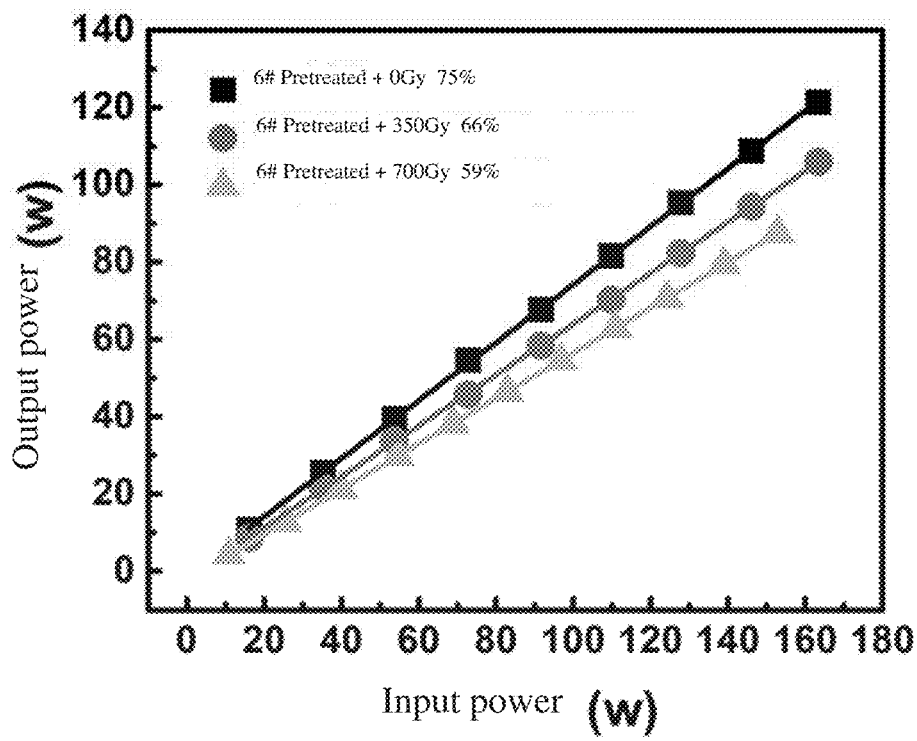
Figure 6F:
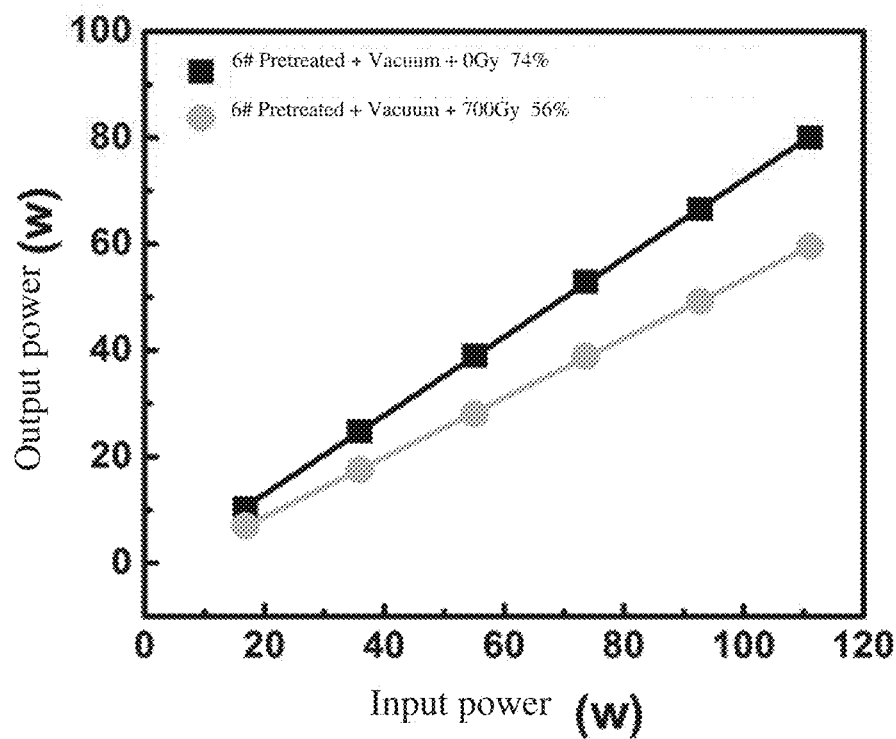

A semiconductor laser with a wavelength of 915 nm is used to pump the optical fibers, and the input and output curves of the laser are tested. The length of the tested optical fiber is 50 m. The test results are shown in FIGS. 5(c) and (e).

The test results show that before irradiation, the laser efficiency of the original optical fiber and the pre-treated optical fiber are 81% and 75%, respectively, and the background loss at the wavelength of 1200 nm is 10 and 18 dB/km, respectively.

After 350 Gy gamma ray irradiation, the original optical fiber has no laser output at all, and the laser efficiency of the pre-treated fiber is 60%, decreasing by 20 percentage points (75%→60%). The background losses of the original optical fiber and the pre-treated optical fiber at the wavelength of 1200 nm are 1060 and 61 dB/m, respectively.

After 700 Gy gamma radiation, the laser efficiency of the pre-treated optical fiber decreases by 36 percentage points (75%→48%), and the background loss at the wavelength of 1200 nm is 88 dB/km.

This comparative experiment shows that high temperature (500° C.) deuterium loaded pre-treatment can not only significantly improve the radiation resistance of the optical fiber, but also this pre-treatment scheme does not have a significant negative impact on the laser performance of the non-irradiated ytterbium-doped optical fiber.

Therefore, this pre-treatment scheme has high practical value for laser optical fibers for space applications.

Application Example 3: High Temperature (280° C.) Deuterium-Loading-Pre-Irradiation-Thermal Annealing Pre-Treatments Improve the Radiation Resistance of Yb—Al—P—Ce—F (YAPCF) Co-Doped Silica Fiber After the two core rod glasses prepared in Example 6 (original sample and pre-treated sample) are sleeved and processed into octagons, and the two preforms are drawn at 1900° C. by a high-temperature drawing tower, and two layers of organic glue are coated on the surface of the optical fiber, wherein the inner layer of organic glue with low refractive index is used as the outer layer structure of the double-clad optical fiber, and the outer layer of organic glue with high refractive index mainly plays a protective role.

Considering that space is a complex environment with microgravity, large temperature difference, high vacuum and strong radiation, in order to evaluate the long-term radiation resistance stability of pre-treated optical fiber, a vacuum drying oven is used to heat and vacuumize the pretreated optical fiber. The vacuumizing conditions are: the vacuum degree is about 100 Pa, the temperature is constant at 70° C., and the time is 30 days.

The original optical fiber, the pre-treated optical fiber and the pre-treated combined with vacuuming optical fiber are irradiated with gamma rays with a dose rate of 0.34 Gy/min and a total dose of 0, 350, and 700 Gy. The laser slope efficiency and loss spectrum of the optical fibers before and after irradiation are measured.

The truncation method is used to test the optical fiber loss, and the test results are shown in FIGS. 6(a-c).

A semiconductor laser with a wavelength of 915 nm is used to pump the optical fibers, and the input and output curves of the laser are tested. The length of the tested optical fiber is 50 m. The test results are shown in FIGS. 6(d-f).

The test results show that before irradiation, the laser efficiencies of the original optical fiber, the pre-treated optical fiber and the pre-treated combined with vacuuming optical fiber are 76%, 75% and 74%, respectively, and the background losses at the wavelength of 1200 nm are 6, 20 and 22 dB/km, respectively.

After 350 Gy gamma ray irradiation, the laser efficiency of the original optical fiber decreases by 85 percentage points (76%→11%), while the laser efficiency of the pre-treated optical fiber decreases by only 12 percentage points (75%→66%). The background losses of the original optical fiber and the pre-treated optical fiber at the wavelength of 1200 nm are 287 and 50 dB/km, respectively.

After 700 Gy gamma ray irradiation, the original optical fiber has no laser output at all, the laser efficiency of the pre-treated optical fiber decreases by 21 percentage points (75%→59%), and the laser efficiency of the pre-treated combined with vacuuming optical fiber decreases by 24 percentage points (74%→56%). The background losses of the original optical fiber, the pre-treated optical fiber and the pre-treated combined with vacuuming optical fiber at the wavelength of 1200 nm are 533, 70, 74 dB/km, respectively.

Comparing pre-treated optical fiber and pre-treated combined with vacuuming optical fiber, it can be seen that heating vacuuming treatment has little effect on the background loss and the laser efficiency of the optical fiber. This result shows that the pre-treatment causes the $D_2$ molecules to chemically react with the glass network to form a stable Si—OD bond, which can inhibit the diffusion of deuterium from the optical fiber in the form of $D_2$ molecules, thereby ensuring that when the active optical fiber is used in a vacuum environment such as space, the anti-radiation performance will not drop sharply over time, and it has long-term stability of anti-radiation performance.

Comparing Application Example 2 and Application Example 3 (or Example 5 and Example 6), it can be seen that the co-doping of cerium (Ce) in the preform core rod glass and the combination of deuterium loading, pre-irradiation and thermal annealing treatments can further improve the radiation resistance of the optical fiber, and will not have a significant negative impact on the laser properties of the unirradiated ytterbium-doped silica fiber.

Application Example 4: High Temperature (900° C.) Deuterium Loading-Pre-Irradiation-Thermal Annealing Pre-Treatments Improve the Radiation Resistance of Er—Al—Ge (EAG1) Co-Doped Silica Fiber After the two core rod glasses prepared in Example 2 (original sample and pretreated sample) are sleeved, and the two preforms are drawn at 2100° C. by a high-temperature drawing tower, and two layers of organic glue are coated on the surface of the optical fiber, wherein the inner layer of organic glue with low refractive index is used as the outer layer structure of the double-clad optical fiber, and the outer layer of organic glue with high refractive index mainly plays a protective role.

The original optical fiber and the pre-treated optical fiber are irradiated with gamma rays with a dose rate of 0.34 Gy/min and a total dose of 0, 350, 700 and 1050 Gy, respectively. The gain and loss spectra of the optical fibers before and after irradiation are measured.

Figure 7A:
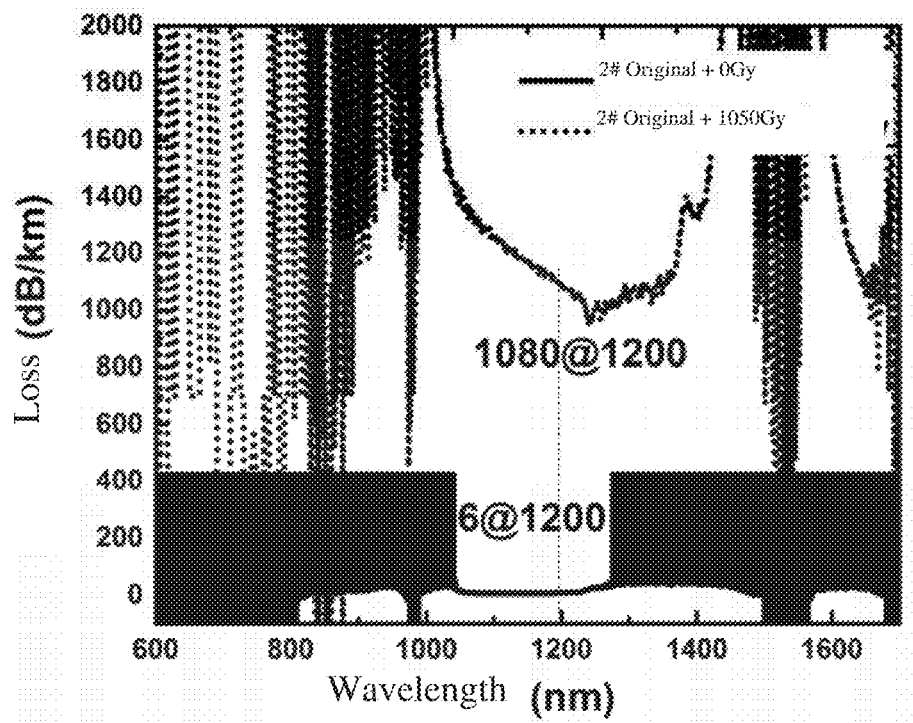
FIG. 7: Loss spectra of the original sample (a) and the pre-treated sample (b) of Er—Al—Ge (EAG1) co-doped silica fibers prepared by Example 2 after irradiation with different doses of gamma rays, the gain spectra (c) of the original sample and the pre-treated sample after irradiation with different doses of gamma rays, and the gain value at 1530 nm with the change of irradiation dose (d).
Figure 7B:
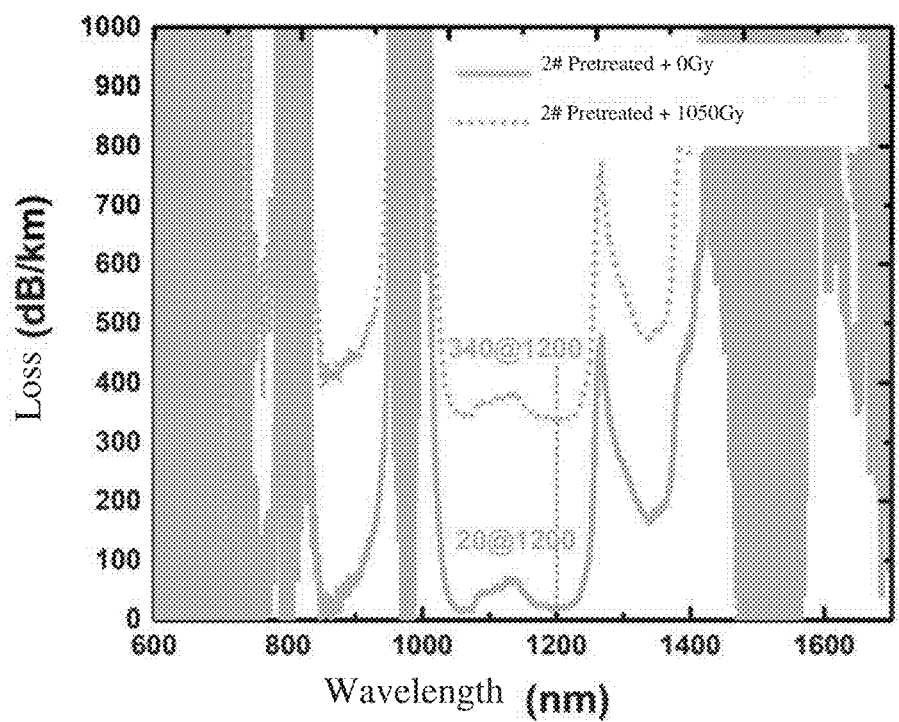

The truncation method is used to test the optical fiber loss, and the test results are shown in FIGS. 7(a) and (b).

Figure 7C:
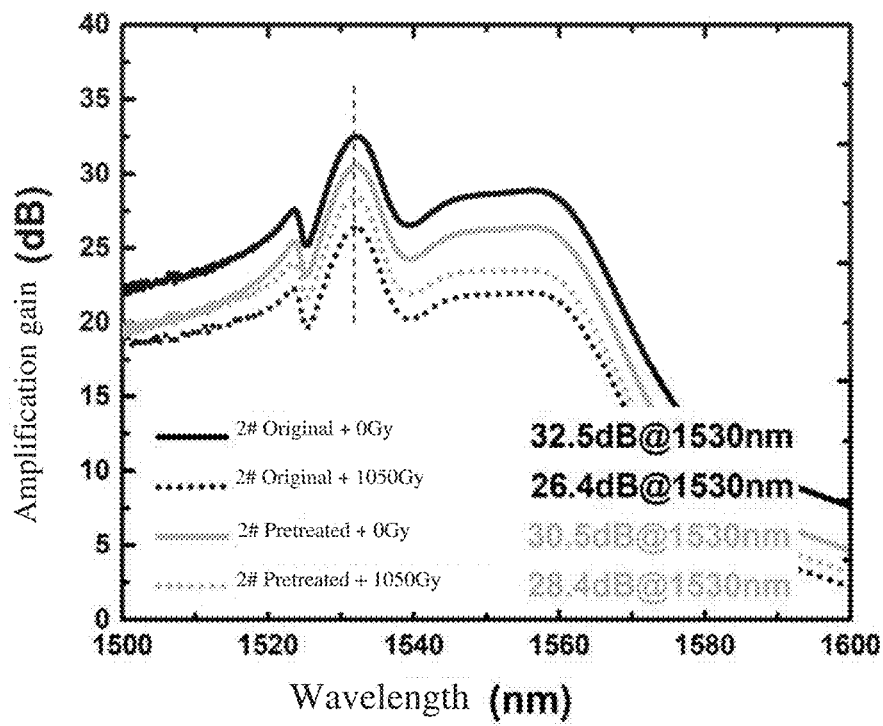
Figure 7D:
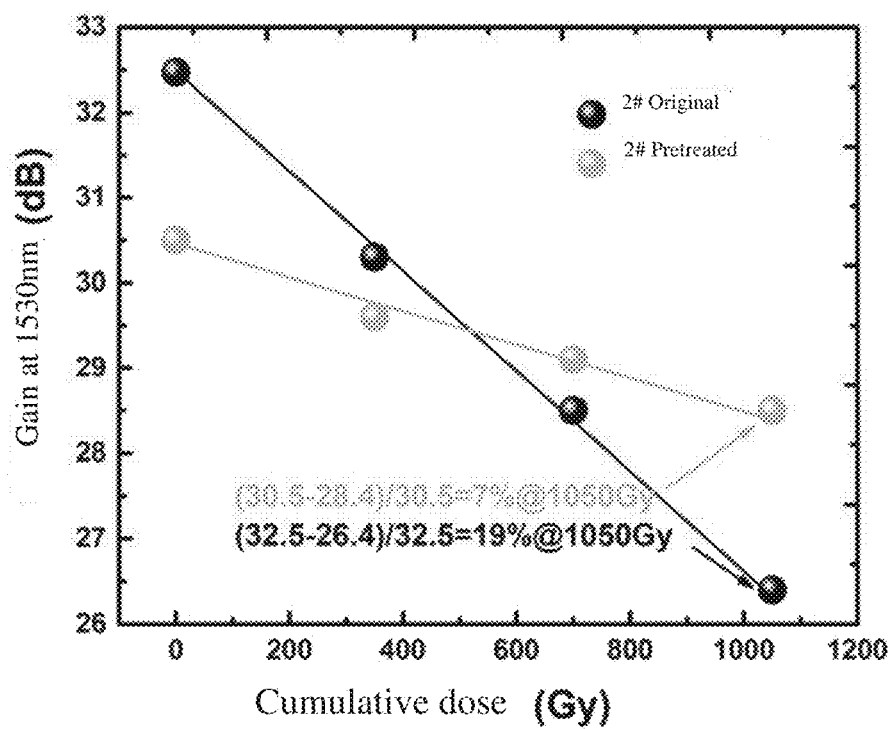

In order to evaluate the gain performance of EAG1 optical fiber, the two ends of the original optical fiber and the pretreated optical fiber are respectively fused with the standard SMF-28 optical fiber. A 980 nm single-mode semiconductor laser is used as the pump source with a pump power of 600 mw. A C+L-band amplified spontaneous emission (ASE) broadband light source is used as the signal light with a power of −30 dBm. The amplification gain spectrum of the optical fiber is tested by the same-direction pumping method. The length of the tested optical fiber is 4 m. The test results are shown in FIGS. 7(c) and (d).

The test results show that before irradiation, the gain of the original optical fiber and the pre-treated optical fiber at 1530 nm is 32.5 dB and 30.5 dB, respectively, and the background loss at 1200 nm is 6 and 20 dB/km, respectively.

After 1050 Gy gamma ray irradiation, the gain of the original optical fiber at 1530 nm is 26.4 dB, decreasing by 19 percentage points (32.5 dB→26.4 dB). The gain of pretreated optical fiber at 1530 nm is 28.4 dB, decreasing by only 7 percentage points (30.5 dB→28.4 dB). The background losses of the original optical fiber and pretreated optical fiber at 1200 nm are 1080 and 340 dB/km, respectively.

This comparison experiment shows that high temperature (900° C.) deuterium loading-pre-irradiation-thermal annealing pretreatment can significantly improve the radiation resistance of erbium-doped silica fiber, but at the same time, this pre-treatment scheme will sacrifice the gain performance of unirradiated erbium-doped optical fiber to some extent. In order to comprehensively improve the radiation resistance of erbium-doped optical fiber and maintain good gain performance, the core composition and pre-treatment conditions of erbium-doped optical fiber need to be further optimized.

The invention provides a radiation-resistant rare earth ($Yb^{3+}$, $Er^{3+}$) doped silica fiber preform core rod and a preparation method therefor for the shortcomings and defects of the existing technology, starting from the performance requirements of the rare earth-doped silica fiber laser or amplifier for space applications in terms of laser and radiation resistance. The invention can effectively improve the anti-radiation performance of the preform core rod by optimizing the components of the preform core rod and sequentially carrying out deuterium loading, pre-radiation and thermal annealing pretreatment on the core rod glass. Fourier transformation infrared spectroscopy (FTIR) test shows that the mass proportion of —OD group in the whole substance in the pre-treated sample is between 16 and 118 ppm. Electron paramagnetic resonance (EPR) test shows that under the same radiation condition, the radiation induced color center concentration in the pre-treated core rod glass is one order of magnitude lower than that in the core rod without pre-treatment. The preform core rod obtained by the invention can be used to prepare radiation-resistant rare earth-doped silica fiber. The optical fiber has the advantages of high laser efficiency, low background loss, and being able to be used stably in a vacuum environment (such as space) for a long time, etc.

What is claimed is:

1. A radiation-resistant laser optical fiber preform core rod, wherein the preform core rod is Yb—Al—P—Ce—F co-doped silica glass, and a composition range of the preform core rod is: $Yb_2O_3$: 0.1~0.2 mol %, $Al_2O_3$: 1.2~1.9 mol %, $P_2O_5$: 2.6~2.7 mol %, $Ce_2O_3$: 0.05~0.07 mol %, F: 0.15~1.1% mol %, $SiO_2$: 94.03-95.9 mol %; the preform core rod also contains —OD group, and a mass ratio of the —OD group in whole substance is 118~150 ppm; wherein the —OD group is introduced by sequentially carrying out gas loading-pre-irradiation-thermal annealing treatments on the preform core rod;
wherein the thermal annealing treatment diffuses deuterium gas molecules left over from chemical reaction from the preform core rod; and
radiation induced color center concentration of powder sample of the preform core rod after being irradiated by 1700 Gy gamma rays is $2.1*10^{14}$ spins/$mm^3$-$120*10^{14}$ spins/$mm^3$.

2. The radiation-resistant laser optical fiber preform core rod according to claim 1, wherein the mass of the powder sample is about 200 mg, and its particle size is less than 1 mm.

3. The radiation-resistant laser optical fiber preform core rod according to claim 1, wherein it is made by the following steps:
S1: providing laser optical fiber preform core rod without pre-treatment;
S2: performing gas loading treatment on the preform core rod described in the step S1;
S3: performing high-energy rays pre-irradiation treatment on the preform core rod after the gas loading treatment;
S4: performing thermally annealing treatment on the preform core rod after the pre-irradiation.

4. The radiation-resistant laser optical fiber preform core rod according to claim 3, wherein the laser optical fiber preform core rod without pre-treatment is prepared by:
1) using a Sol-Gel method combined with a vacuum sintering process; or,
2) using a modified chemical vapor deposition (MCVD) method combined with a solution doping process.

5. The radiation-resistant laser optical fiber preform core rod according to claim 3, wherein the gas loading is pure deuterium gas or a mixed gas of deuterium gas and other gas, the volume ratio of the deuterium gas to the mixed gas is 50%-100%, the pressure of the gas loading treatment is 5.5-15 MPa, the temperature of the gas loading treatment is 100-280° C., the time of the gas loading treatment is 100-720 hours, and the other gas is nitrogen or inert gas.

6. The radiation-resistant laser optical fiber preform core rod according to claim 3, wherein the gas loading is a mixed gas of deuterium gas and nitrogen gas.

7. The radiation-resistant laser optical fiber preform core rod according to claim 3, wherein the high-energy rays are high-energy gamma (γ) rays or X-rays, the total dose of the pre-irradiation is 1-1000 kGy, and the dose rate of the pre-irradiation is 0.5-58.8 kGy/h.

8. The radiation-resistant laser optical fiber preform core rod according to claim 3, wherein the temperature of the thermal annealing is 200-900° C., the time of the thermal annealing is 1-20 hours, the preform core rod is cooled down with the furnace after the thermal annealing is completed, and nitrogen is introduced as a protective gas during the thermal annealing.

9. A method for preparing the radiation-resistant laser optical fiber preform core rod according to claim 1, which comprises the following steps:
S1: providing laser optical fiber preform core rod without pre-treatment;
S2: preforming gas loading treatment on the core rod described in the step S1;
S3: performing high-energy rays pre-irradiation treatment on the preform core rod after the gas loading treatment;
S4: performing thermally annealing on the preform core rod after the pre-irradiation treatment.

10. A radiation-resistant optical fiber, wherein it is prepared by the following steps:
- A1: providing a radiation-resistant laser optical fiber preform core rod according to claim 1;
- A2: grinding and polishing the preform core rod described in the step A1, and putting it into a silica sleeve, and obtaining a single-clad optical fiber preform by a tube rod method;
- A3: drawing the preform core rod described in the step A2 by a high-temperature drawing tower, and coating two layers of organic glue on the surface of the optical fiber, wherein the inner layer of organic glue with low refractive index is used as the outer layer structure of the double-clad optical fiber, and the outer layer of organic glue with high refractive index mainly plays a protective role.

11. The radiation-resistant optical fiber according to claim 10, wherein the background loss of the optical fiber at a wavelength of 1200 nm after irradiation with gamma rays with a dose rate of 0.34 Gy/min and a total dose of 700 Gy is 10-100 dB/km.

\* \* \* \* \*